US012801133B2

(12) United States Patent
Yui et al.

(10) Patent No.: US 12,801,133 B2
(45) Date of Patent: Nov. 17, 2026

(54) SYSTEMS AND METHODS FOR COMMUNICATING WITH AN UNMANNED AERIAL VEHICLE

(71) Applicant: Skydio, Inc., San Mateo, CA (US)

(72) Inventors: Stephen Yui, Pacifica, CA (US); Sean Flanigan, San Mateo, CA (US); Grant McCauley, San Mateo, CA (US)

(73) Assignee: Skydio, Inc., San Mateo, CA (US)

( * ) Notice: Subject to any disclaimer, the term of this patent is extended or adjusted under 35 U.S.C. 154(b) by 300 days.

(21) Appl. No.: 17/738,392

(22) Filed: May 6, 2022

(65) Prior Publication Data

US 2022/0260991 A1 Aug. 18, 2022

Related U.S. Application Data

(63) Continuation of application No. 16/718,746, filed on Dec. 18, 2019, now abandoned, which is a
(Continued)

(51) Int. Cl.
*G05D 1/00* (2024.01)
*B60L 58/12* (2019.01)
(Continued)

(52) U.S. Cl.
CPC ............ *G05D 1/0016* (2013.01); *B60L 58/12* (2019.02); *G05D 1/0038* (2013.01);
(Continued)

(58) Field of Classification Search
CPC ....... B64C 39/02; B64C 39/024; B60L 58/12; B64U 2101/30; B64U 2201/20;
(Continued)

(56) References Cited

U.S. PATENT DOCUMENTS

| | | | |
|---|---|---|---|
| 25,014 A | 8/1859 | Hay | |
| 5,649,240 A | 7/1997 | Saegusa | |

(Continued)

FOREIGN PATENT DOCUMENTS

| | | |
|---|---|---|
| EP | 0583908 | 11/2000 |
| EP | 1286529 | 11/2006 |

(Continued)

OTHER PUBLICATIONS

Extended European Search Report for European Patent Application No. EP 15193305, Mar. 24, 2016, 9 Pages.

(Continued)

*Primary Examiner* — Abby J Flynn
*Assistant Examiner* — Paulo Roberto Gonzalez Leite
(74) *Attorney, Agent, or Firm* — Young Basile Hanlon & MacFarlane, P.C.

(57) ABSTRACT

A system including: an unmanned aerial vehicle (UAV) and a wireless control system. The UAV includes one or more sensors, and a UAV communication subsystem. The one or more sensors configured to capture contextual information associated with capture of visual information. The UAV communication subsystem includes a UAV radio frequency transceiver configured to communicate with a network. The wireless control system includes a housing, a wireless communication subsystem, a flight control setting component, a power component, and a processor. The power component configured to obtain a current power consumption of a power source of the UAV. The processor is configured to: obtain visual information; display the visual information; and communicate with the flight control setting component. The processor communicates with the power component to obtain the current power consumption and effectuate presentation of a power display field including a first portion and a second portion.

20 Claims, 8 Drawing Sheets

Related U.S. Application Data continuation of application No. 15/179,919, filed on Jun. 10, 2016, now abandoned.

(51) Int. Cl.

| | |
|---|---|
| ***B64U 101/30*** | (2023.01) |
| ***G06F 3/04847*** | (2022.01) |
| ***G06F 3/0488*** | (2022.01) |
| ***G08C 17/02*** | (2006.01) |
| ***H04N 5/765*** | (2006.01) |
| ***H04N 21/431*** | (2011.01) |
| ***H04N 21/47*** | (2011.01) |

(52) U.S. Cl.

CPC .......... *G05D 1/0094* (2013.01); *G05D 1/042* (2013.01); *G05D 1/101* (2013.01); *G06F 3/04847* (2013.01); *G06F 3/0488* (2013.01); *G08C 17/02* (2013.01); *H04N 5/765* (2013.01); *H04N 21/4316* (2013.01); *H04N 21/47* (2013.01); *B64U 2101/30* (2023.01); *B64U 2201/20* (2023.01); *G08C 2201/30* (2013.01)

(58) Field of Classification Search

CPC ............... G08C 17/02; G08C 2201/30; G05D 1/0016; G05D 1/0038; G05D 1/0094; G05D 1/042; G05D 1/101; G06F 3/04847; G06F 3/0488; H04N 5/765; H04N 21/4316; H04N 21/47; H04N 5/77; Y02T 10/70

See application file for complete search history.

(56) References Cited

U.S. PATENT DOCUMENTS

| | | | | |
|---|---|---|---|---|
| 5,721,989 | A | 2/1998 | Kitazawa | |
| 5,914,941 | A | 6/1999 | Janky | |
| 6,341,201 | B1 | 1/2002 | Ishiguro | |
| 6,415,107 | B1 | 7/2002 | Ogawa | |
| 7,599,608 | B2 | 10/2009 | Takemoto | |
| 8,750,157 | B1 | 6/2014 | Jagannath | |
| 8,811,206 | B2 | 8/2014 | Shukla | |
| 8,984,143 | B2 | 3/2015 | Serra | |
| 8,994,800 | B2 | 3/2015 | Brockway | |
| 8,995,903 | B2 | 3/2015 | Brockway | |
| 9,036,016 | B2 | 5/2015 | Brockway | |
| 9,766,622 | B1 | 9/2017 | Yang | |
| 9,851,724 | B2 | 12/2017 | Bianchi | |
| 2002/0067412 | A1 | 6/2002 | Kawai | |
| 2003/0120929 | A1 | 6/2003 | Hoffstein | |
| 2004/0107366 | A1 | 6/2004 | Balfanz | |
| 2005/0036766 | A1 | 2/2005 | Takemoto | |
| 2005/0114716 | A1 | 5/2005 | O | |
| 2005/0223248 | A1 | 10/2005 | Lim | |
| 2006/0171388 | A1 | 8/2006 | Ikeda | |
| 2006/0208088 | A1 | 9/2006 | Sekiguchi | |
| 2007/0288331 | A1 | 12/2007 | Ebrom | |
| 2008/0046545 | A1 | 2/2008 | Koren | |
| 2008/0170569 | A1 | 7/2008 | Garg | |
| 2008/0232780 | A1 | 9/2008 | Yamada | |
| 2008/0247377 | A1 | 10/2008 | Van Horn | |
| 2008/0298305 | A1 | 12/2008 | Nakamura | |
| 2008/0310405 | A1 | 12/2008 | Cox | |
| 2010/0084513 | A1* | 4/2010 | Gariepy | G05D 1/0094 244/190 |
| 2010/0118147 | A1* | 5/2010 | Dorneich | H04N 21/4331 348/143 |
| 2010/0305778 | A1 | 12/2010 | Dorneich | |
| 2010/0311441 | A1 | 12/2010 | Hazlett | |
| 2011/0019104 | A1 | 1/2011 | Kwak | |
| 2011/0035149 | A1* | 2/2011 | McAndrew | G08G 5/006 701/466 |
| 2011/0044303 | A1 | 2/2011 | Ji | |
| 2011/0050926 | A1 | 3/2011 | Asano | |
| 2011/0063457 | A1 | 3/2011 | Tokumitsu | |
| 2011/0202983 | A1 | 8/2011 | Pope | |
| 2011/0221692 | A1 | 9/2011 | Seydoux | |
| 2011/0307610 | A1 | 12/2011 | Hayashi | |
| 2012/0044354 | A1 | 2/2012 | Cheng | |
| 2012/0063337 | A1 | 3/2012 | Shukla | |
| 2012/0099572 | A1 | 4/2012 | Kato | |
| 2012/0106449 | A1 | 5/2012 | Shibuya | |
| 2012/0110031 | A1 | 5/2012 | Lahcanski | |
| 2012/0213134 | A1 | 8/2012 | Woo | |
| 2012/0249802 | A1 | 10/2012 | Taylor | |
| 2012/0271491 | A1 | 10/2012 | Spata | |
| 2012/0322413 | A1 | 12/2012 | Haddad | |
| 2012/0327225 | A1 | 12/2012 | Barley | |
| 2013/0076908 | A1 | 3/2013 | Bratton | |
| 2013/0081113 | A1 | 3/2013 | Cherian | |
| 2013/0120592 | A1 | 5/2013 | Bednarczyk | |
| 2013/0142136 | A1 | 6/2013 | Pi | |
| 2013/0173088 | A1 | 7/2013 | Callou | |
| 2013/0176423 | A1 | 7/2013 | Rischmuller | |
| 2013/0189925 | A1 | 7/2013 | Staskawicz | |
| 2013/0222583 | A1 | 8/2013 | Earnshaw | |
| 2013/0223279 | A1 | 8/2013 | Tinnakornsrisuphap | |
| 2013/0337857 | A1 | 12/2013 | Hassan | |
| 2014/0028435 | A1 | 1/2014 | Brockway | |
| 2014/0028816 | A1 | 1/2014 | Brockway | |
| 2014/0028817 | A1 | 1/2014 | Brockway | |
| 2014/0028818 | A1 | 1/2014 | Brockway | |
| 2014/0109184 | A1 | 4/2014 | Parker, II | |
| 2014/0266731 | A1 | 9/2014 | Malhotra | |
| 2014/0359148 | A1 | 12/2014 | Cherian | |
| 2014/0376448 | A1 | 12/2014 | Kao | |
| 2015/0244912 | A1 | 8/2015 | Chang | |
| 2015/0321758 | A1* | 11/2015 | Sarna, II | G05D 1/0011 244/63 |
| 2016/0066184 | A1 | 3/2016 | Bhargav-Spantzel | |
| 2016/0105644 | A1 | 4/2016 | Smith | |
| 2016/0139595 | A1 | 5/2016 | Yang | |
| 2016/0294573 | A1 | 10/2016 | Huang | |
| 2016/0295094 | A1 | 10/2016 | Endoh | |
| 2016/0332747 | A1* | 11/2016 | Bradlow | B64U 10/13 |
| 2016/0364004 | A1 | 12/2016 | Ekandem | |
| 2017/0034419 | A1 | 2/2017 | Brockway | |
| 2017/0068424 | A1 | 3/2017 | Hong | |
| 2017/0168481 | A1 | 6/2017 | Flanigan | |
| 2017/0189823 | A1 | 7/2017 | Tang | |
| 2017/0206648 | A1 | 7/2017 | Marra | |
| 2017/0236291 | A1 | 8/2017 | Balley | |
| 2017/0247098 | A1 | 8/2017 | Sanlaville | |
| 2017/0247106 | A1 | 8/2017 | Sanlaville | |
| 2017/0248969 | A1 | 8/2017 | Ham | |
| 2017/0256288 | A1* | 9/2017 | Ai | G11B 31/006 |
| 2017/0297707 | A1 | 10/2017 | Rollefstad | |
| 2017/0308077 | A1 | 10/2017 | Iskrev | |
| 2018/0024546 | A1 | 1/2018 | Ha | |
| 2018/0364695 | A1* | 12/2018 | Ponnarasseri | H02J 1/00 |
| 2019/0016475 | A1* | 1/2019 | Zhong | B64C 39/024 |

FOREIGN PATENT DOCUMENTS

| | | | |
|---|---|---|---|
| EP | 1742410 | A1 | 1/2007 |
| JP | 2014080148 | A | 5/2014 |
| WO | 2014144753 | A1 | 9/2014 |

OTHER PUBLICATIONS

Office Action for U.S. Appl. No. 13/558,273, Oct. 15, 2014, 19 Pages.

United States Office Action, U.S. Appl. No. 14/628,057, May 18, 2016, 9 pages.

United States Office Action, U.S. Appl. No. 14/628,057, Jan. 21, 2016, 11 pages.

United States Office Action, U.S. Appl. No. 13/558,194, Oct. 3, 2014, 11 pages.

Extended European Search Report for European Patent Application No. EP 15193308, Mar. 24, 2016, 12 pages.

(56) References Cited

OTHER PUBLICATIONS

Extended European Search Report for European Patent Application No. EP 15193309, Mar. 24, 2016, 10 Pages.
Supplementary European Search Report for European Patent Application No. EP 13823575, Jul. 22, 2015, 8 pages.
PCT International Search Report and Written Opinion for PCT/US2013/051548, Feb. 7, 2014, 14 Pages.
Communication pursuant to Article 94(3) EPC for European Patent Application No. EP 13823575.9, Apr. 5, 2016, 4 Pages.

* cited by examiner

SYSTEMS AND METHODS FOR COMMUNICATING WITH AN UNMANNED AERIAL VEHICLE

CROSS REFERENCE TO RELATED APPLICATIONS

This application is a continuation of U.S. application Ser. No. 16/718,746, filed Dec. 18, 2019, which claims priority to U.S. application Ser. No. 15/179,919, filed Jun. 10, 2016, the contents of which are incorporated by reference herein in its entirety.

TECHNICAL FIELD

The disclosure relates to a wireless control system for communicating with an unmanned aerial vehicle.

BACKGROUND

Unmanned aerial vehicles, or UAVs, may be equipped with automated flight control, remote flight control, programmable flight control, other types of flight control, and/or combinations thereof. Some UAVs may include sensors, including but not limited to, image sensors configured to capture visual information. Flight control and/or image capture may be controlled and/or manipulated by a user via a remote controller. Adjustment of flight control settings may impact various aspects of images and/or videos captured by the image sensors of the UAV.

SUMMARY

The disclosure relates to a wireless control system configured to communicate with an unmanned aerial vehicle (UAV), multi-purpose devices, other wireless control systems, and/or other devices in accordance with one or more implementations. The wireless control system may include a housing, a touch sensitive display, one or more input mechanisms, a processor, a bus, an input/output (I/O) subsystem, a navigation subsystem, a power subsystem, a display subsystem, an audio/visual subsystem, a communication subsystem, an electronic storage, and/or other components. The wireless control system may include radio frequency transceivers. The radio frequency transceivers may receive communications from the UAV and/or other devices. The radio frequency transceivers may transmit communications to the UAV and/or other devices.

The wireless control system may be a remote controller and/or other device configured to communicate with the UAV and/or communicate with other devices. Other devices may include one or more of a computing platform, a mobile device and/or multi-purpose device (e.g., desktop computer, a laptop computer, a handheld computer, a NetBook, a Smartphone, a gaming console, and/or other computing platforms, and/or other multi-purpose device), a camera (e.g., an action camera, a sports camera, and/or other type of camera), a video recorder, and/or other device configured to communicate with the wireless control system and/or the UAV. The wireless control system may be configured to be handheld via the housing. The housing may be configured to support, hold, and/or carry components of the wireless control system.

The touch sensitive display may be carried by the housing. The touch sensitive display may be provided by a device (e.g., a mobile phone, a tablet, and/or other devices) coupled with the housing and/or carried by the housing. The touch sensitive display may be integrally included within the housing. The processor may be configured to effectuate presentation of a user interface (not shown) via the touch sensitive display. For example, the processor may be configured to effectuate presentation of information related to configuring the wireless control system, configuring the UAV, communicating information to the UAV, communicating information to other devices, displaying information from the UAV (e.g., one or more images captured by an image capture subsystem, as will be discussed in further detail below, and/or other information obtained from the UAV), displaying information from other devices, and/or presentation of other information. The touch sensitive display may be a liquid crystal display (LCD), a light emitting diode (LED) display, an organic LED (OLED) display, a plasma screen, and/or other displays. The touch sensitive display may be configured with capacitive and/or resistive technologies. One or more transparent conductive layers (not shown) may be placed on and/or integrated with the touch sensitive display. A top surface of the touch sensitive display may be a two-dimensional plane. A user may interact with the touch sensitive display by touching the top surface of the touch sensitive display with one or more objects including one or more fingers, stylus, and/or other objects. The touch may include a pressure of the one or more objects in contact with and/or near contact with the top surface of the touch sensitive display.

The wireless control system may include one or more input mechanisms. The one or more input mechanisms may be included within the housing. Depending on the embodiment of the wireless control system, one or more input mechanisms may take various forms including, but not limited to, control sticks (e.g., joysticks, digital sticks, or analog sticks such as thumbsticks, which may be operable by a user's finger), buttons, switches, directional pads, sensors, levers, touchpads, and/or other forms of input mechanisms. In some embodiments, a button may include an electronic button, a mechanical button, a trigger, a shoulder button, a bumper button, and/or other buttons. A switch may include a rocker switch, a flip switch, a slide switch, and/or other switches. A directional pad may include a round directional pad or a plus-shaped directional pad. The one or more input mechanisms may be digital or analog in nature, and/or may vary in size, appearance, contour, and/or material based upon the embodiment of the wireless control system.

The wireless control system may include multiple radio frequency transceivers included within the housing. A first radio frequency transceiver included within the wireless control system may communicate with the UAV. The first radio frequency transceiver may communicate with the UAV via a dedicated radio frequency protocol. A second radio frequency transceiver included within the wireless control system may communicate with a network (e.g., the Internet and/or other networks). The second radio frequency transceiver may communicate with the network via a Wi-Fi protocol. A third radio frequency transceiver included within the wireless control system may communicate with other wireless control systems (e.g., other remote controls, etc.) and/or multi-purpose devices (e.g., desktop computer, a laptop computer, a handheld computer, a NetBook, a Smartphone, a gaming console, and/or other wireless control systems and/or multi-purpose devices). The third radio frequency transceiver may communicate with other wireless control systems and/or multi-purpose devices via a Wi-Fi protocol and/or Bluetooth protocol.

The processor of the wireless control system may be configured to execute one or more computer program components via computer readable instructions. The computer program components may include one or more of a visual information component, a flight control settings component, a power component, a presentation component, an inputs component, a transmission component, a takeoff component, and/or other components.

The visual information component may be configured to obtain, via the first radio frequency transceiver, visual information captured by an image capture subsystem of the UAV. The image capture subsystem may include a gimbal. The gimbal may be configured to allow for rotation of an object about an axis. The object may include a mount for an image capturing device (e.g., a camera and/or other image capturing device). As such, the image capturing device may be adjusted via the gimbal. The image capturing device and/or the image capture subsystem may include one or more sensors and/or one or more lenses. The one or more lenses may be, for example, a wide angle lens, hemispherical, a hyper hemispherical lens that focuses light entering the lens to the one or more image sensors which may capture the visual information, and/or other lenses.

One or more sensors may include one or more image sensors. The one or more image sensors may be configured to generate an output signal conveying visual information within a field of view of the one or more image sensors. The image capture subsystem of the UAV may be configured to control one or more sensors through adjustments of an aperture timing, an exposure, a focal length, an angle of view, a depth of field, a focus, a light metering, a white balance, a resolution, a frame rate, an object of focus, a capture angle, a zoom parameter, a video format, a sound parameter, a compression parameter, and/or other sensor controls.

The visual information may be captured as an image, a video, a spherical image, a spherical video segment, a sound clip, and/or as other information. A spherical image and/or spherical video segment may include a 360 degree field of view in a horizontal plane and a 180 degree vertical field of view in a vertical plane.

The visual information component may be configured to display, via the touch sensitive display, the visual information obtained from the UAV, via the first radio frequency transceiver. In this manner, a user may view the visual information being captured by the image capture subsystem within the field of view of one or more sensors in real-time and/or near real-time.

The flight control settings component may be configured to obtain, via the first radio frequency transceiver, current flight control settings of the UAV. The current flight control settings may define current aspects of the flight control subsystem for the UAV. The wireless control system may receive inputs via engagement of one or more of the multiple input mechanisms to control and/or adjust flight control settings of the UAV. Current flight control settings may include one or more of a current altitude, a current longitude, a current latitude, a current geographical location, a current heading, a current speed, and/or other current flight control settings of the UAV. Flight control of the UAV may be based upon a position of the UAV. The position of the UAV may impact capture of the visual information. For example, an altitude in which the UAV is flying and/or hovering may impact the visual information captured by an image sensor (e.g., the visual information may be captured at different angles based upon the altitude of the UAV). A speed and/or direction in which the UAV is traveling may capture different visual information.

The power component may be configured to obtain, via the first radio frequency transceiver, current power consumption of a power source of the UAV. The UAV may include a power source. The power source may power the UAV. The power source may include one or more of removable batteries (e.g., lithium-ion batteries and/or other removable batteries), fuel cells, gasoline, solar energy, thermal energy, and/or other power sources. Various factors account for power consumption of the power source of the UAV. For example, a power source that weighs more than another power source may weigh down the UAV more than the other power source, causing the UAV to consume more power from the power source due to the added weight to propel the UAV. The speed and/or acceleration of the UAV may affect power consumption of the power source.

The power component may be configured to determine an amount of remaining power of the power source. The amount of power available via various power sources may vary for individual power sources. For example, UAVs powered by fuel cells and/or solar energy may last longer than UAVs powered by batteries. Some power sources, such as batteries, may last less than 20 minutes of flight time. As discussed above, various factors account for power consumption of the power source of the UAV (e.g., speed, acceleration, weight, etc.). It may be beneficial to determine the amount of remaining power of the power source in order to determine an amount of flight time remaining for the UAV based upon the amount of remaining power of the power source and/or the current flight control settings of the UAV.

The presentation component may be configured to effectuate presentation, via the touch sensitive display, of a power display field over the visual information. The power display field may extend from at or near a first edge of the touch sensitive display to at or near a second edge of the touch sensitive display. The power display field may graphically represent the amount of remaining power of the power source of the UAV such that a user using the wireless control system may quickly glance at the touch sensitive display to learn the amount of remaining power of the power source. As will be discussed in further detailed below, other information including the amount of remaining flight time for the UAV, one or more of the current flight control settings of the UAV, and/or other information may be displayed over the visual information and/or the power display field such that the user using the wireless control system may quickly glance at the touch sensitive display to learn the other information. The presentation component may be configured to effectuate presentation, via the touch sensitive display, of one or more of the current flight control settings over the power display field.

The wireless control system may be configured to arm the UAV and/or automatically takeoff the UAV. The inputs component may be configured to receive an arm input when a first input mechanism of the multiple input mechanisms is engaged. Individual input mechanisms may be associated with various inputs and/or controls for the wireless control system and/or the UAV when engaged in various positions. For example, one of the multiple input mechanisms may include a button. Engaging the button (e.g., pressing the button) for less than a first predetermined period of time may represent an input (e.g., an input to arm the UAV), while engaging the button for more than the first predefined period of time may represent a different input (e.g., an input to initialize an automated takeoff of the UAV). The inputs component may be configured to receive the arm input when the input mechanism is engaged. Arming the UAV (e.g., receiving the arm input via the input mechanism) may refer to engaging and/or turning on one or more rotors (e.g., allowing for the rotors to begin rotating) of the UAV without the UAV lifting off a surface.

In response to receiving the arm input, the transmission component may be configured to effectuate transmission, via the first radio frequency transceiver, of a first set of instructions to the UAV. The first set of instructions may be configured to arm the UAV.

In response to receiving the arm input, the takeoff component may be configured to initiate an automated takeoff of the UAV if any one of the following conditions may be met: (1) the engagement of the first input mechanism that caused the UAV to be armed is continued for a first predefined period of time; (2) a touch on or near an indicated location of the touch sensitive display is detected; or (3) a second input mechanism of the multiple input mechanisms is engaged for less than a second predefined period of time. The automated takeoff of the UAV may refer to the UAV lifting off into the air without regard for user inputs received via the touch sensitive display and/or the multiple input mechanisms to adjust flight control settings of the UAV. The automated takeoff of the UAV may include lifting off a surface for a predefined height before accepting adjustments to flight control settings and/or an image capture subsystem of the UAV from the touch sensitive display and/or the multiple input mechanisms.

In response to receiving initiation of the automated takeoff, the transmission component may be configured to effectuate transmission, via the first radio frequency transceiver, of a second set of instructions to the UAV. As discussed above, the second set of instructions may be configured to control the UAV without regard for user inputs received through the touch sensitive display and/or the multiple input mechanisms. The automated takeoff of the UAV may include lifting off the surface for a predefined height before accepting adjustments to flight control settings and/or an image capture subsystem of the UAV from the touch sensitive display and/or the multiple input mechanisms.

The wireless control system may be configured to replay a video segment that was captured during flight of the UAV. The visual information component may be configured to obtain, via the first radio frequency transceiver, visual information captured by the image capture subsystem of the UAV. The visual information component may be configured to display the visual information via the touch sensitive display.

The inputs component may be configured to obtain a first set of instructions, via a first set of inputs, to begin recording the visual information as a first video segment. The inputs component may be configured to obtain the first set of instructions from the first set of inputs by detecting a touch on or near the touch sensitive display and/or engagement of one or more of the multiple input mechanisms. In this manner, a user may record the visual information within the field of view of one or more sensors of the UAV (via the image capture subsystem).

The transmission component may be configured to effectuate transmission, via the first radio frequency transceiver, of the first set of instructions to the UAV. The first set of instructions may be configured to begin recording the visual information. The user may adjust flight control and/or control of the image capture subsystem via the wireless control system while recording the visual information.

The inputs component may be configured to obtain a second set of instructions, via a second set of inputs, to stop recording the first video segment. The inputs component may be configured to obtain the second set of instructions from the second set of inputs by detecting a touch on or near the touch sensitive display and/or engagement of one or more of the multiple input mechanisms. In this manner, a user may stop recording the visual information within the field of view of one or more sensors of the UAV (via the image capture subsystem). The transmission component may be configured to effectuate transmission, via the first radio frequency transceiver, of the second set of instructions to the UAV. The second set of instructions may be configured to stop recording the visual information.

In response to the second set of instructions, the presentation component may be configured to effectuate presentation, via the touch sensitive display, of a replay input. The replay input may refer to an input that may allow the user using the wireless control system to view the first video segment that the UAV captured. The user may view the first video segment while UAV remains in flight and/or may view the first video segment at a later time.

The inputs component may be configured to receive, via a touch on and/or proximate to the replay input on the touch sensitive display, engagement and/or activation of the replay input. In response to activation of the replay input, the presentation component may be configured to effectuate presentation, via the touch sensitive display, of the first video segment. In this manner, the user using the wireless control system may view the first video segment while UAV remains in flight.

The present teachings provide: a device including: an unmanned aerial vehicle and a wireless control system. The UAV includes one or more sensors, and a UAV communication subsystem. The one or more sensors configured to capture contextual information associated with capture of visual information. The UAV communication subsystem includes a UAV radio frequency transceiver configured to communicate with a network. The wireless control system in communication with the unmanned aerial vehicle. The wireless control system includes a housing, a wireless communication subsystem, a flight control setting component, a power component, and a processor. The wireless communication subsystem in communication with the UAV communication subsystem. The wireless communication subsystem has a UAV radio frequency transceiver in communication with the UAV. The flight control setting component is in communication with the UAV radio frequency transceiver and configured to obtain current flight control settings of the UAV. The power component configured to obtain, via the UAV radio frequency transceiver, a current power consumption of a power source of the UAV. The processor included within the housing. The processor is configured to: obtain, via the UAV radio frequency transceiver, visual information captured by the one or more sensors of the unmanned aerial vehicle; display the visual information; communicate with the flight control setting component to obtain the current flight control settings of the UAV. The current flight control settings define current aspects of a flight control subsystem for the unmanned aerial vehicle. The processor communicates with the power component to obtain the current power consumption of a power source of the UAV, wherein the power source powers the unmanned aerial vehicle. The processor effectuates presentation of a power display field over the visual information, wherein the power display field includes a first portion and a second portion.

The present teachings provide: a device including an unmanned aerial vehicle (UAV) and a wireless control system. The (UAV) includes one or more sensors configured to capture contextual information associated with capture of visual information The UAV includes a UAV communication subsystem. The UAV communication subsystem includes a UAV radio frequency transceiver configured to communicate with a network. The wireless control system in communication with the unmanned aerial vehicle. The wireless control system includes a housing, a touch sensitive display, a wireless communication subsystem, a flight control setting component, a power component, and a processor. The touch sensitive display carried by the housing. The wireless communication subsystem in communication with the UAV communication subsystem. The wireless communication subsystem includes a UAV radio frequency transceiver in communication with the UAV. The flight control setting component in communication with the UAV radio frequency transceiver and configured to obtain current flight control settings of the UAV. The power component configured to obtain, via the UAV radio frequency transceiver, a current power consumption of a power source of the UAV. A processor included within the housing. The processor is configured to: obtain, via the UAV radio frequency transceiver, visual information captured by the one or more sensors of the unmanned aerial vehicle. The processor is configured to display the visual information. The processor is configured to communicate with the flight control setting component to obtain the current flight control settings of the UAV, wherein the current flight control settings define current aspects of a flight control subsystem for the unmanned aerial vehicle. The processor is configured to initiate an automated takeoff of the UAV without regard for user inputs received via the touch sensitive display and/or the UAV communication subsystem. The processor is configured to communicate with the power component to obtain the current power consumption of a power source of the UAV. The processor is configured to effectuate presentation of a power display field over the touch sensitive display, wherein the touch sensitive display includes a first portion and a second portion.

The present teachings provide a device including an unmanned aerial vehicle and a wireless control system. The UAV includes: one or more sensors and a UAV communication subsystem. The one or more sensors configured to capture contextual information associated with capture of visual information. The UAV communication subsystem includes a UAV radio frequency transceiver configured to communicate with a network. The wireless control system in communication with the unmanned aerial vehicle. The wireless control system includes a housing, a touch screen display, a wireless communication, a power component, and a processor. The touch sensitive display is carried by the housing. The wireless communication subsystem in communication with the UAV communication subsystem. The wireless communication subsystem includes a UAV radio frequency transceiver in communication with the UAV. The power component is configured to obtain, via the UAV radio frequency transceiver, a current power consumption of a power source of the UAV. The processor is included within the housing. The processor is configured to: obtain, via the UAV radio frequency transceiver, visual information captured by the one or more sensors of the unmanned aerial vehicle. The processor is configured to: display the visual information. The processor is configured to: communicate with the power component to obtain the current power consumption of a power source of the UAV. The processor is configured to: display a power display field that comprises a top edge, a bottom edge, a left edge, and a right edge with the top edge and the bottom edge being parallel and the left edge being perpendicular to the top edge and the bottom edge. The processor is configured to: display an angular display within a corner of the touch sensitive display. The processor is configured to: communicate with a flight control setting component to obtain a current flight control settings of the UAV, wherein the current flight control settings define current aspects of a flight control subsystem for the unmanned aerial vehicle. The processor is configured to: initiate an automated takeoff of the UAV without regard for user inputs received via the touch sensitive display and/or the UAV communication subsystem. The processor is configured to: effectuate presentation of a power display field over the touch sensitive display, wherein the touch sensitive display includes a first portion and a second portion.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of “a”, “an”, and “the” include plural referents unless the context clearly dictates otherwise.

DETAILED DESCRIPTION

Figure 1:
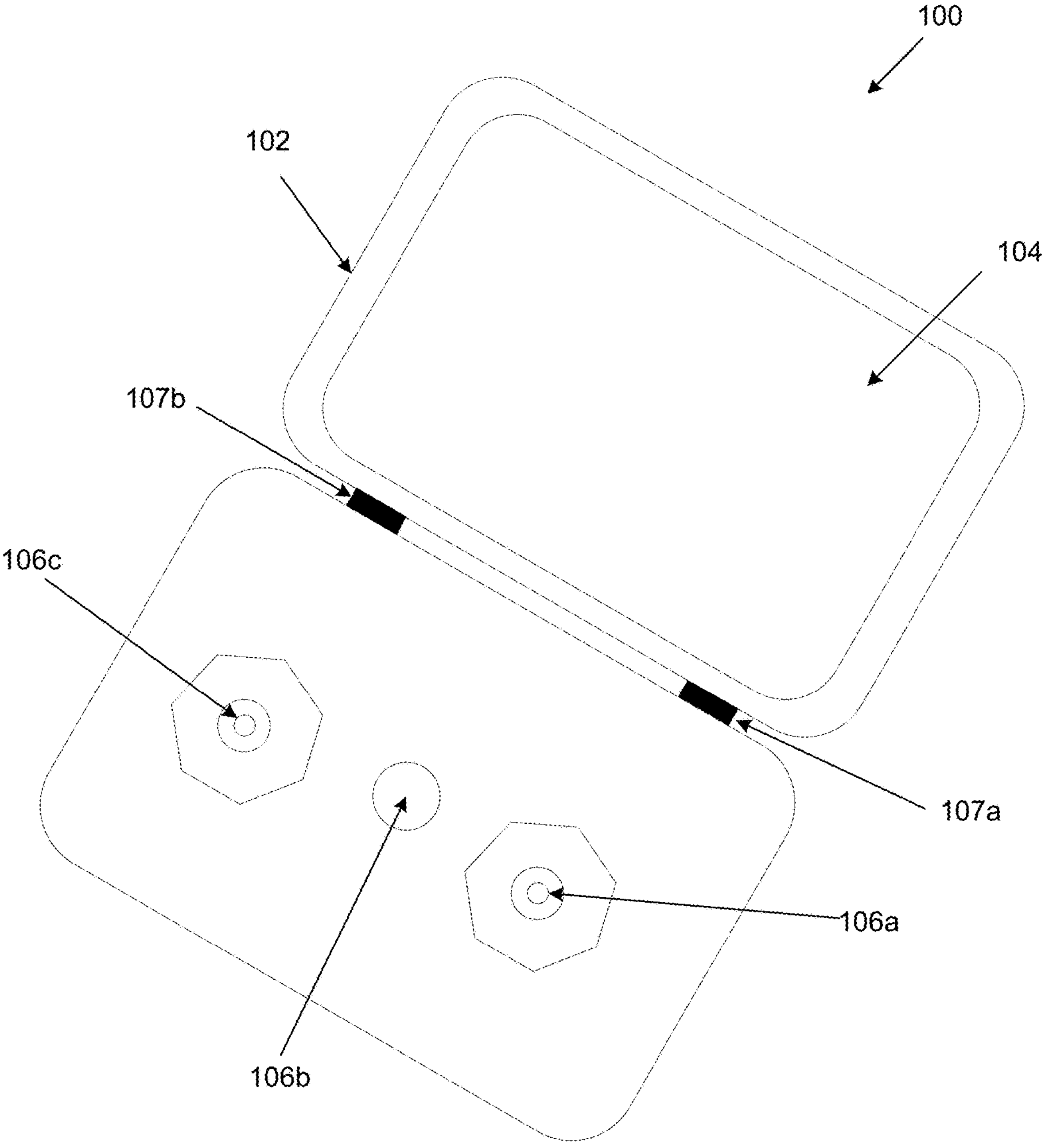
FIG. 1 illustrates a wireless control system, in accordance with one or more implementations.
Figure 2:
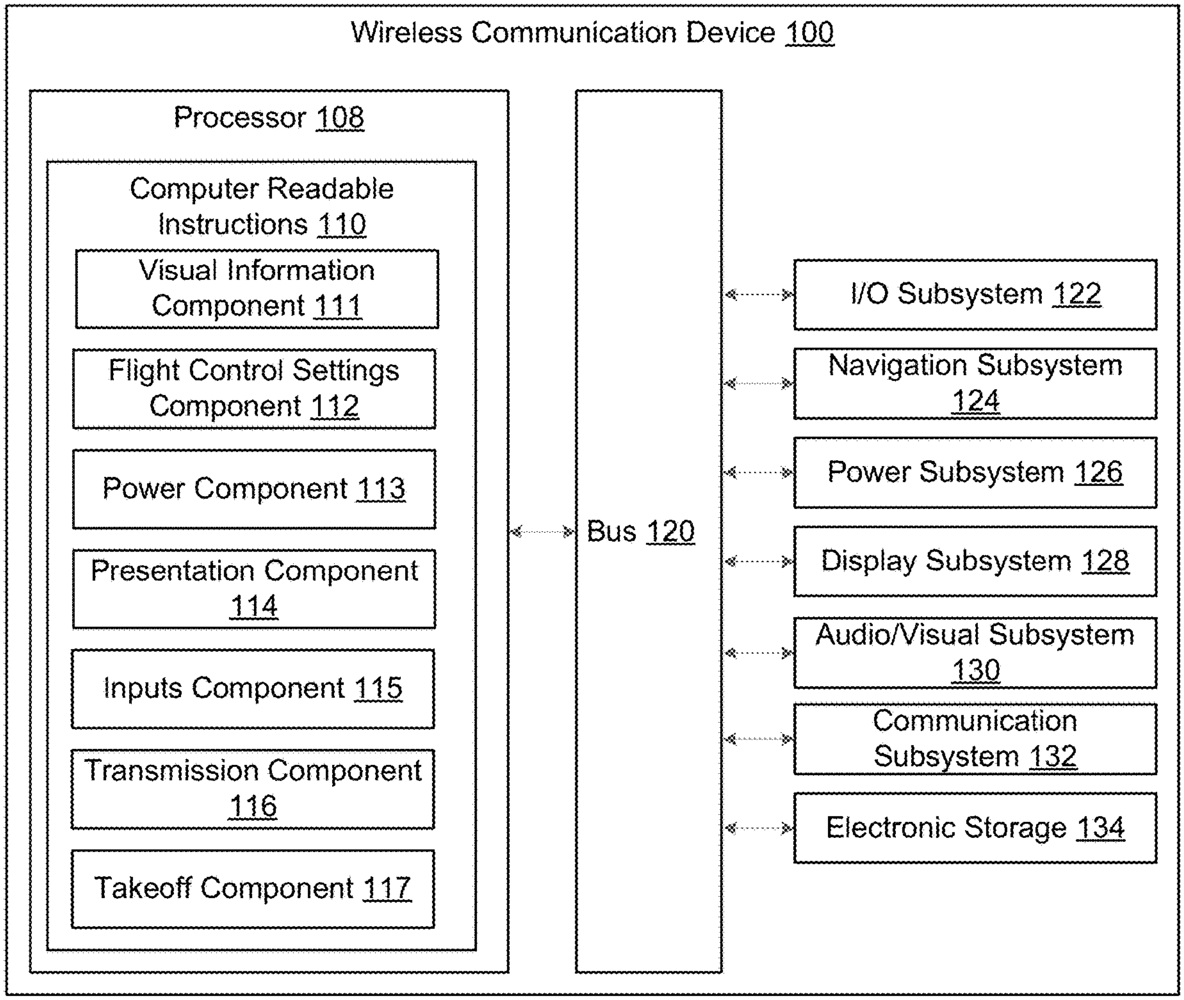
FIG. 2 illustrates a wireless control system configured to communicate with an unmanned aerial vehicle and/or other devices, in accordance with one or more implementations.

FIGS. 1 and 2 illustrate a wireless control system 100 configured to communicate with an unmanned aerial vehicle (UAV), multi-purpose devices, other wireless control systems, and/or other devices in accordance with one or more implementations. Wireless control system 100 may include housing 102, touch sensitive display 104, one or more input mechanisms (e.g., input mechanisms 106*a*, 106*b*, and/or 106*c*), processor 108, bus 120, I/O subsystem 122, navigation subsystem 124, power subsystem 126, display subsystem 128, audio/visual subsystem 130, communication subsystem 132, electronic storage 134, and/or other components. Wireless control system 100 may include radio frequency transceivers (e.g., included within I/O subsystem 122, communication subsystem 132, and/or other components) included within housing 102. The radio frequency transceivers may receive communications from a UAV, multi-purpose devices, other wireless control systems, and/or other devices. The radio frequency transceivers may transmit communications to the UAV and/or other devices. Individual components may be located external to wireless control system 100, in which case, wireless control system 100 may receive information from the externally located components.

Wireless control system 100 may include a remote controller and/or other device configured to communicate with the UAV and/or communicate with other devices. Other devices may include one or more of a computing platform, a mobile device and/or multi-purpose device (e.g., desktop computer, a laptop computer, a handheld computer, a NetBook, a Smartphone, a gaming console, and/or other computing platforms, and/or other multi-purpose device), a camera (e.g., an action camera, a sports camera, and/or other type of camera), a video recorder, and/or other device configured to communicate with wireless control system 100 and/or the UAV. Wireless control system 100 may be configured to be handheld via housing 102. Housing 102 may be configured to support, hold, and/or carry components of wireless control system 100.

Touch sensitive display 104 may be carried by the housing. Touch sensitive display 104 may be provided by a device (e.g., a mobile phone, a tablet, and/or other devices) coupled with housing 102 and/or carried by housing 102. Touch sensitive display 104 may be integrally included within housing 102. Processor 108 may be configured to effectuate presentation of a user interface (not shown) via touch sensitive display 104. For example, processor 108 may be configured to effectuate presentation of information related to configuring wireless control system 100, configuring the UAV, communicating information to the UAV, communicating information to other devices, displaying information from the UAV (e.g., one or more images captured by an image capture subsystem, as will be discussed in further detail below, and/or other information obtained from the UAV), displaying information from other devices, and/or presentation of other information. Touch sensitive display 104 may be a liquid crystal display (LCD), a light emitting diode (LED) display, an organic LED (OLED) display, a plasma screen, and/or other displays. Touch sensitive display 104 may be configured with capacitive and/or resistive technologies. The touch sensitive display 104 may be an angular display within a corner. One or more transparent conductive layers (not shown) may be placed on and/or integrated with touch sensitive display 104. A top surface of touch sensitive display 104 may be a two-dimensional plane. A user may interact with touch sensitive display 104 by touching the top surface of touch sensitive display 104 with one or more objects including one or more fingers, stylus, and/or other objects. The touch may include a pressure of the one or more objects in contact with and/or near contact with the top surface of touch sensitive display 104.

As will be discussed in further detail below, processor 108 may be configured to detect parameters of the touch on the top surface of touch sensitive display 104. The parameters of the touch may include a location of the touch on and/or near the top surface of touch sensitive display 104, a distance of the one or more objects from the top surface of touch sensitive display 104, an amount of pressure on the top surface of touch sensitive display 104, a duration of time of the touch on the top surface of touch sensitive display 104, a starting position of the touch and/or an ending position of the touch on the top surface of touch sensitive display 104 (e.g., a swiping motion), and/or other parameters. The location of the touch on and/or near the top surface of touch sensitive display 104 may include an x-y coordinate of the location of the touch on and/or near the top surface of touch sensitive display.

Wireless control system 100 may include one or more input mechanisms (e.g., input mechanisms 106*a*, 106*b*, and/or 106*c*). The one or more input mechanisms may be included within housing 102. Depending on the embodiment of wireless control system 100, one or more input mechanisms may take various forms including, but not limited to, control sticks (e.g., joysticks, digital sticks, or analog sticks such as thumbsticks, which may be operable by a user's finger), buttons, switches, directional pads, sensors, levers, touchpads, and/or other forms of input mechanisms. In some embodiments, a button may include an electronic button, a mechanical button, a trigger, a shoulder button, a bumper button, and/or other buttons. A switch may include a rocker switch, a flip switch, a slide switch, and/or other switches. A directional pad may include a round directional pad or a plus-shaped directional pad. The one or more input mechanisms may be digital or analog in nature, and/or may vary in size, appearance, contour, and/or material based upon the embodiment of wireless control system 100.

Housing 102 may include one or more portions. If housing 102 includes a single portion, touch sensitive display 102 may be integrally included within the single portion of housing 102. If housing 102 includes more than one portion, touch sensitive display 102 may be integrally included within one of the multiple portions of housing 102 and/or carried by one of the multiple portions of housing 102. For example and referring to FIG. 1, touch sensitive display 102 may be integrally included within one portion of housing 102 while input mechanisms 106*a*, 106*b*, and 106*c* may be included within a different and/or separate portion of housing 102. The different and/or separate portions of housing 102 may be integrally connected via one or more hinges (e.g., one or more hinges 107*a*, 107*b*) allowing for the separate portions of housing 102 to pivot in one or more directions relative to one another. For example, housing 102 may open via one or more hinges 107*a*, 107*b* and/or close via one or more hinges 107*a*, 107*b*. In an embodiment, touch sensitive display 104 and/or input mechanisms 106*a*, 106*b*, and/or 106*c* may not be exposed and/or accessible when housing 102 is closed. Wireless control system 100 as shown in FIG. 1 is for illustrative purposes only, as other embodiments of wireless control system 100 may be configured in various shapes and/or sizes. For example, multiple touch sensitive displays may be integrally included within housing 102, touch sensitive display 102 may be provided by a device (e.g., a smartphone and/or other device) carried by housing 102 via one or more hinges 107*a* and/or 107*b*, and/or other embodiments may be provided and/or available.

Referring to FIGS. 1 and 2, I/O subsystem 122 may include input and/or output interfaces and/or electronic couplings to interface with devices that allow for transfer of information into or out of wireless control system 100. For example, I/O subsystem 122 may be a physical interface such as a universal serial bus (USB) or a media card (e.g., secure digital (SD)) slot.

I/O subsystem 122 may be associated with communication subsystem 132 to include multiple radio frequency transceivers. Individual radio frequency transceivers may be used to transmit and/or receive radio signals between individual devices. For example, communication subsystem 132 may include one or more wireless communication mechanisms such as Wi-Fi (short range and/or long range), long term evolution (LTE), 3G/4G/5G, and/or other wireless communication mechanisms. Communication subsystem 132 may include wired communication mechanisms such as Ethernet, USB, HDMI, and/or other wired communication mechanisms.

A first radio frequency transceiver included within wireless control system 100 may communicate with the UAV. The first radio frequency transceiver may communicate with the UAV via a dedicated radio frequency protocol. A second radio frequency transceiver included within wireless control system 100 may communicate with a network (e.g., the Internet and/or other networks). The second radio frequency transceiver may communicate with the network via a Wi-Fi protocol. A third radio frequency transceiver included within wireless control system 100 may communicate with other wireless control systems (e.g., other remote controls, etc.) and/or multi-purpose devices (e.g., desktop computer, a laptop computer, a handheld computer, a NetBook, a Smartphone, a gaming console, and/or other wireless control systems and/or multi-purpose devices). The third radio frequency transceiver may communicate with other wireless control systems and/or multi-purpose devices via a Wi-Fi protocol and/or Bluetooth protocol.

Navigation subsystem 124 may include electronics, controls, and/or interfaces for navigation associated with wireless control system 100. Navigation subsystem 124 may include, for example, a global position system (GPS) and/or a compass. The GPS and/or the compass may be used to track a current location of wireless control system 100. The location of wireless control system 100 may be relative to a location of the UAV.

Power subsystem 126 may include electronics, controls, and/or interfaces for providing power to wireless control system 100. Power subsystem 126 may include direct current (DC) power sources (e.g., batteries). Power subsystem 126 may be configured for alternating current (AC) power sources. Power subsystem 126 may include power management processes for extending DC power source lifespan. In some embodiments, power subsystem 126 may be comprised of power management integrated circuit and a low power microprocessor for power regulation. The microprocessor in such embodiments may be configured to provide low power states to preserve battery life, an ability to wake from low power states (e.g., exit the lower power state) via engagement of one or more input mechanisms 106*a*, 106*b*, and/or 106*c* of wireless control system 100, and/or other power related functionalities of wireless control system 100.

Display subsystem 128 may be configured to provide one or more interfaces, electronics, and/or display drivers for touch sensitive display 104 integrally included within housing 102 of wireless control system 100.

Audio/visual subsystem 130 may include interfaces, electronics, and/or drivers for an audio output (e.g., headphone jack, speakers, etc.). Audio/visual subsystem 130 may include interfaces, electronics, and/or drivers for visual indicators (e.g., LED lighting associated with one or more input mechanisms 106*a*, 106*b*, and/or 106*c*, etc.).

Electronic storage 134 may include electronic storage media that electronically stores information. Electronic storage 134 may store software algorithms, information determined, obtained, and/or processed by processor 108, user preferences for wireless control system 100, user preferences for the UAV, visual information obtained and/or received from an image capture subsystem of the UAV (as will be discussed in further detail below), information received from one or more other wireless control systems and/or multi-purpose devices, information received remotely, and/or other information that enables wireless control system 100 to function properly.

The electronic storage media of electronic storage 134 may include one or both of storage that is provided integrally (i.e., substantially non-removable) with wireless control system 100 and/or removable storage that is removably connectable to wireless control system 100 via, for example, a port (e.g., a USB port, a firewire port, etc.) or a drive (e.g., a disk drive, etc.). Electronic storage 134 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 134 may include one or more virtual storage resources (e.g., cloud storage, a virtual private network, and/or other virtual storage resources).

Processor 108 may be configured to provide information processing capabilities within wireless control system 100. As such, processor 108 may include one or more of a digital processor, an analog processor, a digital circuit designed to process information, a central processing unit, a graphics processing unit, a microcontroller, an analog circuit designed to process information, a state machine, and/or other mechanisms for electronically processing information. For example, a microcontroller may be one or more of 8051, PIC, AVR, and ARM microcontroller. In some implementations, processor 108 may include multiple processing units. In some implementations, processor 108 may be coupled with one or more of RAM, ROM, input/output ports, and/or other peripherals.

Processor 108 may be configured to execute one or more computer program components via computer readable instructions 110. The computer program components may include one or more of visual information component 111, flight control settings component 112, power component 113, presentation component 114, inputs component 115, transmission component 116, takeoff component 117, and/or other components.

Figure 3:
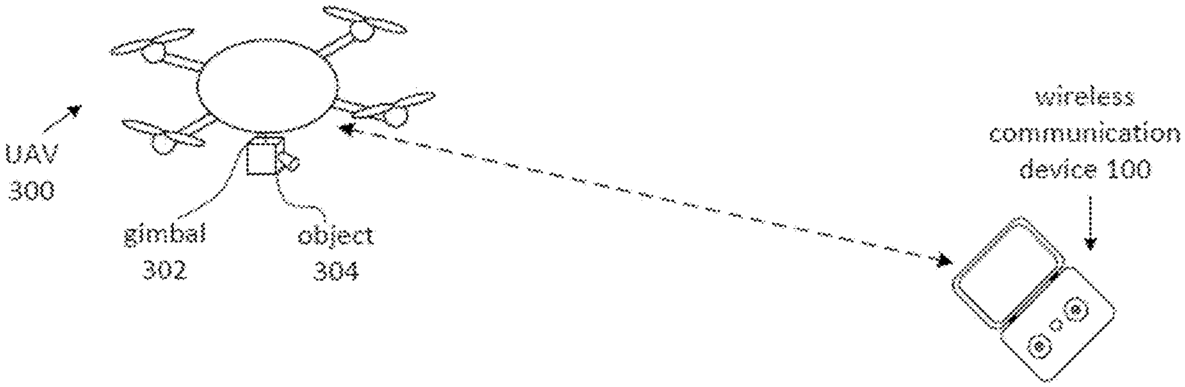
FIG. 3 illustrates a wireless control system in communication with an unmanned aerial vehicle, in accordance with one or more implementations.

Referring to FIG. 3, UAV is shown in communication with wireless control system 100. Wireless control system 100 may communicate with, guide, and/or control UAV 300.

Figure 4:
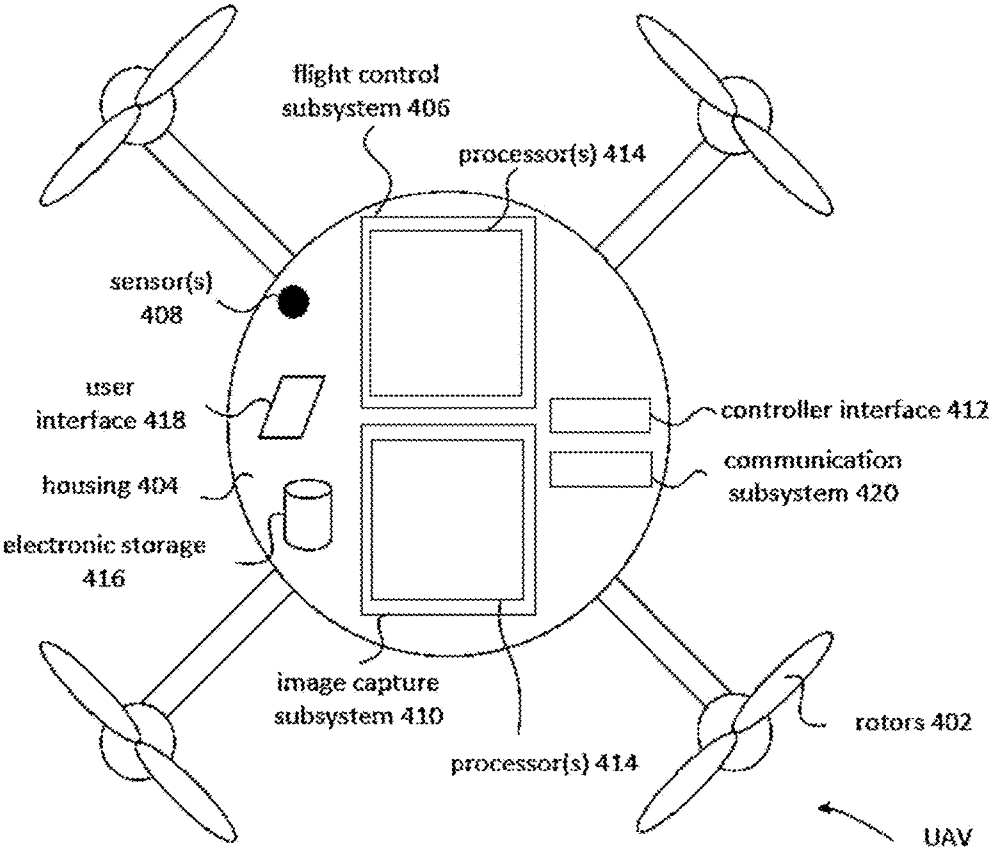
FIG. 4 illustrates an unmanned aerial vehicle, in accordance with one or more implementations.

Referring to FIG. 4, UAV 300 is illustrated. While UAV 300 is shown as a quadcopter, this is for exemplary purposes only and is not meant to be a limitation of this disclosure. As illustrated in FIG. 4, UAV 300 may include four rotors 402. The number of rotors of UAV 300 is not meant to be limiting in anyway, as UAV 300 may include any number of rotors. UAV 300 may include one or more of housing 404, flight control subsystem 406, one or more sensors 408, image capture subsystem 410, controller interface 412, one or more physical processors 414, electronic storage 416, user interface 418, communication subsystem 420, and/or other components. Housing 404 may be configured to support, hold, and/or carry UAV 300 and/or components thereof.

Referring to FIGS. 2-4, visual information component 111 may be configured to obtain, via the first radio frequency transceiver, visual information captured by image capture subsystem 410 of UAV 300. Image capture subsystem 410 may include gimbal 302, one or more sensors 408, a processor 410, one or more lenses and/or other optical components, and/or other components. Gimbal 302 may be configured to allow for rotation of object 304 in different directions. Object 304 may include a mount for an image capturing device (e.g., a camera and/or other image capturing device). As such, the image capturing device may be adjusted via gimbal 302. The one or more lenses may be, for example, a wide angle lens, hemispherical, a hyper hemispherical lens that focuses light entering the lens to the one or more image sensors which may capture the visual information, and/or other lenses.

While single sensor 408 is depicted in FIG. 4, this is not meant to be limiting in any way. UAV 300 may include any number of sensors 408. One or more sensors 408 may include one or more image sensors. The one or more image sensors may be configured to generate an output signal conveying visual information within a field of view of the one or more image sensors. Image capture subsystem 410 may be configured to control one or more sensors 408 through adjustments of an aperture timing, an exposure, a focal length, an angle of view, a depth of field, a focus, a light metering, a white balance, a resolution, a frame rate, an object of focus, a capture angle, a zoom parameter, a video format, a sound parameter, a compression parameter, and/or other sensor controls.

The visual information may be captured as an image, a video, a spherical image, a spherical video segment, a sound clip, and/or as other information. A spherical image and/or spherical video segment may include a 360 degree field of view in a horizontal plane and a 180 degree vertical field of view in a vertical plane. One or more sensors 408 may capture high-definition images having a resolution of, for example, 720p, 1080p, 4 k, or higher. In one embodiment, a spherical video segment may be captured as a 5760 pixels by 2880 pixels with a 360 degree horizontal field of view and a 180 degree vertical field of view. One or more sensors 408 may capture a video segment at frame rates of, for example, 30 frames per second, 60 frames per second, or higher.

One or more sensors 408 may be configured to capture contextual information associated with capture of the visual information. Contextual information may define one or more temporal attributes and/or spatial attributes associated with capture of the visual information. Contextual information may include any information pertaining to an environment in which the visual information. Contextual information may include visual and/or audio information based upon the environment in which the visual information was captured. Temporal attributes may define a time in which the visual information was captured (e.g., date, time, time of year, season, etc.). Spatial attributes may define the environment in which the visual information was captured (e.g., location, landscape, weather, surrounding activities, etc.). The one or more temporal attributes and/or spatial attributes may include one or more of a geolocation attribute, a time attribute, a date attribute, a content attribute, and/or other attributes.

A geolocation attribute may include a physical location of where the visual information was captured. The geolocation attribute may correspond to one or more of a compass heading, one or more physical locations of where the visual information was captured, a pressure at the one or more physical locations, a depth at the one or more physical locations, a temperature at the one or more physical locations, and/or other information. For example, one or more sensors 408 may include a global positioning system (GPS), an altimeter, an accelerometer, a gyroscope, a magnetometer, and/or other sensors. Examples of the geolocation attribute may include the name of a country, region, city, a zip code, a longitude and/or latitude, and/or other information relating to a physical location where the visual information was captured.

A time attribute may correspond to a one or more timestamps associated with when the visual information was captured. Examples of the time attribute may include a time local to the physical location (which may be based upon the geolocation attribute) of when the visual information was captured, the time zone associated with the physical location, and/or other information relating to a time when the visual information was captured.

A date attribute may correspond to a one or more of a date associated with when the visual information was captured, seasonal information associated with when the visual information was captured, and/or a time of year associated with when the visual information was captured.

A content attribute may correspond to one or more of an action depicted within the visual information, one or more objects depicted within the visual information, and/or a landscape depicted within the visual information. For example, the content attribute may include a particular action (e.g., running), object (e.g., a building), and/or landscape (e.g., beach) portrayed and/or depicted in the visual information. One or more of an action depicted within the visual information may include one or more of sport related actions, inactions, motions of an object, and/or other actions. One or more of an object depicted within the visual information may include one or more of a static object (e.g., a building), a moving object (e.g., a moving train), a particular actor (e.g., a body), a particular face, and/or other objects. A landscape depicted within the visual information may include scenery such as a desert, a beach, a concert venue, a sports arena, etc. Content of the visual information be determined based upon object detection of content included within the visual information.

Flight control subsystem 406 may be configured to provide flight control for UAV 300. Flight control subsystem 406 may include one or more physical processors 414 and/or other components. Operation of flight control subsystem 406 may be based on flight control settings and/or flight control information. Flight control information may be based on information and/or parameters determined and/or obtained to control UAV 300. In some implementations, providing flight control settings may include functions including, but not limited to, flying UAV 300 in a stable manner, tracking people or objects, avoiding collisions, and/or other functions useful for autonomously flying UAV 300. Flight control information may be transmitted by a remote controller (e.g., wireless control system 100). In some implementations, flight control information and/or flight control settings may be received by controller interface 412.

User interface 418 of UAV 300 may be configured to provide an interface between UAV 300 and a user (e.g. a remote user using a graphical user interface displayed via touch sensitive display 104 of wireless control system 100) through which the user may provide information to and receive information from UAV 300. This may enable data, results, and/or instructions and any other communicable items to be communicated between the user and UAV 300, such as flight control settings and/or image capture controls. Examples of interface devices suitable for inclusion in user interface 418 may include a keypad, buttons, switches, a keyboard, knobs, levers, a display screen, a touch screen, speakers, a microphone, an indicator light, an audible alarm, a printer, and/or other devices. Information may be provided to a user (e.g., via wireless control system 100) by user interface 318 in the form of auditory signals, visual signals, tactile signals, and/or other sensory signals.

It is to be understood that other communication techniques, either hard-wired or wireless, may be contemplated herein as user interface 418. For example, in one embodiment, user interface 418 may be integrated with a removable storage interface provided by electronic storage 416. In this example, information may be loaded into UAV 300 from removable storage (e.g., a smart card, a flash drive, a removable disk, etc.) that may enable a user to customize UAV 300 via wireless control system 100. Other exemplary input devices and/or techniques adapted for use with UAV 300 as user interface 418 may include, but are not limited to, an RS-232 port, RF link, an IR link, modem (telephone, cable, Ethernet, internet or other).

Communication subsystem 420 may include multiple radio frequency transceivers. Individual radio frequency transceivers may be used to transmit and/or receive radio signals between individual devices. For example, communication subsystem 420 may include one or more wireless communication mechanisms such as Wi-Fi (short range and/or long range), long term evolution (LTE), 3G/4G/5G, and/or other wireless communication mechanisms. While not shown, communication subsystem 420 may include wired communication mechanisms such as Ethernet, USB, HDMI, and/or other wired communication mechanisms.

A first radio frequency transceiver included within UAV 300 may communicate with wireless control system 100. The first radio frequency transceiver may communicate with wireless control system 100 via a dedicated radio frequency protocol. A second radio frequency transceiver included within UAV 300 may communicate with a network (e.g., the Internet and/or other networks). The second radio frequency transceiver may communicate with the network via a Wi-Fi (e.g., short range and/or long range) protocol. Other radio frequency transceivers may be included within UAV 300.

Referring to FIGS. 1-4, visual information component 111 may be configured to display, via touch sensitive display 104, the visual information obtained from UAV 300, via the first radio frequency transceiver. In this manner, a user may view the visual information being captured by image capture subsystem 410 of UAV 300 within the field of view of one or more sensors 408. For example, if UAV 300 is hovering over a snowboarder, the user may view the snowboarder and/or surrounding areas via touch sensitive display 104 as the visual information is obtained, via the first radio frequency transceiver, in real-time and/or near real-time.

Flight control settings component 112 may be configured to obtain, via the first radio frequency transceiver, current flight control settings of UAV 300. The current flight control settings may define current aspects of flight control subsystem 406 for UAV 300. Wireless control system 100 may receive inputs via engagement of one or more of the multiple input mechanisms (e.g., input mechanisms 106*a*, 106*b*, and/or 106*c*) to control and/or adjust flight control settings of UAV 300. Current flight control settings may include one or more of a current altitude, a current longitude, a current latitude, a current geographical location, a current heading, a current speed, and/or other current flight control settings of UAV 300. Flight control of UAV 300 may be based upon a position of UAV 300. The position of UAV 300 may impact capture of the visual information. For example, an altitude in which UAV 300 is flying and/or hovering may impact the visual information captured by an image sensor (e.g., the visual information may be captured at different angles based upon the altitude of UAV 300). A speed and/or direction in which UAV 300 is traveling may capture different visual information.

Power component 113 may be configured to obtain, via the first radio frequency transceiver, current power consumption of a power source of UAV 300. UAV 300 may include a power source (not shown in FIG. 4). The power source may power UAV 300. The power source may include one or more of removable batteries (e.g., lithium-ion batteries and/or other removable batteries), fuel cells, gasoline, solar energy, thermal energy, and/or other power sources. Various factors account for power consumption of the power source of UAV 300. For example, a power source that weighs more than another power source may weigh down UAV 300 more than the other power source, causing UAV 300 to consume more power from the power source due to the added weight to propel UAV 300. The speed and/or acceleration of UAV 300 may affect power consumption of the power source.

Power component 113 may be configured to determine an amount of remaining power of the power source. The amount of power available via various power sources may vary for individual power sources. For example, UAVs powered by fuel cells and/or solar energy may last longer than UAVs powered by batteries. Some power sources, such as batteries, may last less than 20 minutes of flight time. As discussed above, various factors account for power consumption of the power source of UAV 300 (e.g., speed, acceleration, weight, etc.). It may be beneficial to determine the amount of remaining power of the power source in order to determine an amount of flight time remaining for UAV 300 based upon the amount of remaining power of the power source and/or the current flight control settings of UAV 300.

Presentation component 114 may be configured to effectuate presentation, via touch sensitive display 104, of a power display field over the visual information. The power display field may extend from at or near a first edge of touch sensitive display 104 to at or near a second edge of touch sensitive display 104. The power display field may graphically represent the amount of remaining power of the power source of UAV 300 such that a user using wireless control system 100 may quickly glance at touch sensitive display 104 to learn the amount of remaining power of the power source. As will be discussed in further detailed below, other information including the amount of remaining flight time for UAV 300, one or more of the current flight control settings of UAV 300, and/or other information may be displayed over the visual information and/or the power display field such that the user using wireless control system 100 may quickly glance at touch sensitive display 104 to learn the other information.

The first edge of touch sensitive display 104 may be opposite the second edge of touch sensitive display 104. The first edge may be a left edge of touch sensitive display 104. The first edge may be a top edge of touch sensitive display 104. The second edge may be a right edge of touch sensitive display 104. The second edge may be a bottom edge of touch sensitive display 104. The left edge may be opposite the right edge. The top edge may be opposite the bottom edge. For example, the power display field may extend along the top edge of touch sensitive display 104. The power display field may extend along the bottom edge of touch sensitive display 104. That is, the power display field may extend from at or near the left edge of touch sensitive display 104 to at or near the right edge of touch sensitive display 104, extending along the top and/or bottom edge of touch sensitive display 104. The power display field may extend along the left edge of touch sensitive display 104. The power display field may extend along the right edge of touch sensitive display 104. That is, the power display field may extend from at or near the top edge of touch sensitive display 104 to at or near the right edge of touch sensitive display 104, extending along the left and/or right edge of touch sensitive display 104. The power display field may be rectangular in shape, however this is for exemplary purposes only. Location and/or orientation of the power display field displayed via touch sensitive display 104 is provided for illustrative purposes only, as the power display field may be located anywhere and/or oriented in any way via touch sensitive display 104. For example, the power display field may be circular and/or any other shape and/or size.

Figure 5:
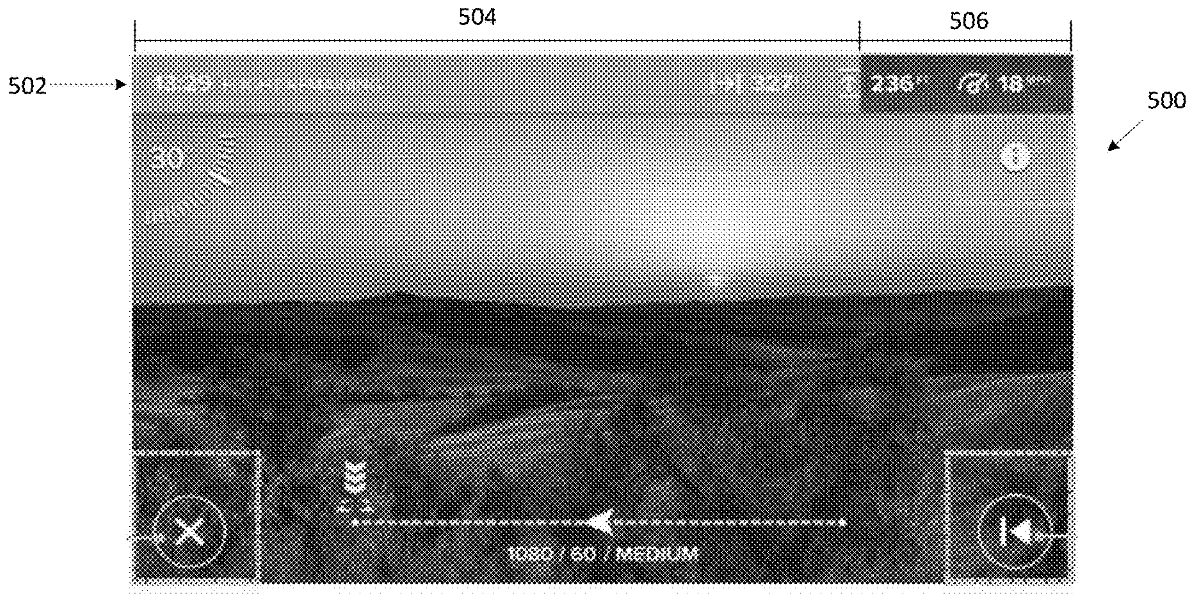
FIG. 5 illustrates an exemplary depiction of a user interface of a power display field, in accordance with one or more implementations.

The power display field may include a first portion and a second portion. A length of the first portion across the power display field may be proportional to the amount of remaining power of the power source. A length of the second portion across the power display field may be proportional to an amount of power consumed from the power source. For example, referring to FIG. 5, power display field 502 is depicted via user interface 500. As shown in FIG. 5, the length of first portion 504 across power display field 502 may be proportional to the amount of remaining power of the power source. The length of second portion 506 across power display field 502 may be proportional to the amount of power consumed from the power source.

Figure 6:
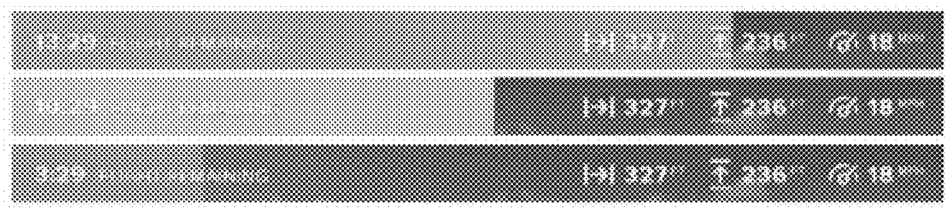
FIG. 6 illustrates exemplary depictions of power display fields, in accordance with one or more implementations.

The visual information may be visible through the second portion of the power display field. While shown as darkened out in FIG. 5, the visual information may be visible through second portion 506 of power display field 502. For example, referring to FIG. 6, three exemplary power display fields are provided for illustrative purposes only. As shown in FIG. 6, the visual information (e.g., sky and clouds) may be visible through the second portion of individual power display fields.

Referring to FIGS. 1-6, presentation component 114 may be configured to effectuate presentation, via touch sensitive display 104, of one or more of the current flight control settings over power display field 502. Presentation component 114 may be configured to effectuate presentation, via touch sensitive display 104, of one or more of the current flight control settings over first portion 504 of power display field 502 (e.g., UAV 300 may be hovering 236 feet high and 327 feet to the right of wireless control system 100 or from a location where UAV 300 departed). Presentation component 114 may be configured to effectuate presentation, via touch sensitive display 104, of one or more of the current flight control settings over second portion 506 of power display field 502 (e.g., UAV 300 may be traveling at 18 MPH). As shown in FIG. 6, the current flight control settings that may be displayed over the second portion of the power display field may be viewable over the visual information.

Wireless control system 100 may be configured to determine a remaining flight time of UAV 300 based upon the amount of remaining power of the power source and the current flight control settings. Presentation component 114 may be configured to effectuate presentation, via touch sensitive display 104, of the remaining flight time of UAV 300 over the first portion of the power display field (e.g., remaining flight time of 13 minutes and 29 seconds, as shown in FIGS. 5 and 6). While not shown, presentation component 114 may be configured to effectuate presentation, via touch sensitive display 104, of the remaining flight time of UAV 300 over the second portion of the power display field. The remaining flight time of UAV 300 that may be displayed over the second portion of the power display field may be viewable over the visual information. In this manner, the user using wireless control system 100 may quickly glance at touch sensitive display 104 to determine how much flight time may remain for UAV 300 based upon the amount of remaining power of the power source and the current flight control settings. The user using wireless control system 100 may determine how to control UAV 300 based upon the remaining flight time of UAV 300 (e.g., return UAV 300 home, land UAV 300 in a particular location such that the user may go to that destination to retrieve UAV 300, etc.).

Referring to FIG. 6, a color of the first portion of the power display field may correspond to the amount of remaining power of the power source. For example, green may correspond to a full power source relative to the amount of remaining power of the power source (e.g., 13 minutes and 29 seconds of remaining flight time), yellow may correspond to a low power source relative to the amount of remaining power of the power source (e.g., 10 minutes and 29 seconds of remaining flight time), and red may correspond to a very low power source relative to the amount of remaining power of the power source (e.g., 3 minutes and 29 seconds of remaining flight time). The colors and/or the corresponding amount of remaining power of the power source shown in FIG. 6 are for illustrative purposes only, as other colors may be used to depict the amount of remaining power of the power source. Other colors may signify other amounts of remaining power of the power source. For example, a flashing red color may represent that the remaining flight time of UAV 300 is under 2 minutes.

If the amount of remaining power of the power source is very low, presentation component 114 may be configured to effectuate presentation, via touch sensitive display 104, of a power warning (not shown). The power warning may be graphical and may be displayed over the visual information such that the user using wireless control system 100 may quickly glance at touch sensitive display 104 to view the power warning. The power warning may remain displayed via touch sensitive display 104 for the duration of the current flight session of UAV 300. For example, the power warning may be displayed via touch sensitive display 104 if the remaining flight time of UAV 300 is under 2 minutes. The power warning may remain displayed via touch sensitive display 104 for the duration of the 2 minutes, until UAV 300 has landed, until the power source powering UAV 300 has run out of power, and/or other until another event occurs.

Inputs component 115 may be configured to detect parameters of a touch on touch sensitive display 104. As discussed above, touch sensitive display 104 may be configured with capacitive and/or resistive technologies. A user may interact with touch sensitive display 104 by touching a top surface of touch sensitive display 104 with one or more objects including one or more fingers, stylus, and/or other objects. The top surface of touch sensitive display 104 may be a two-dimensional plane. The parameters of the touch may include a location of the touch on and/or near the top surface of touch sensitive display 104, a distance of the one or more objects from the top surface of touch sensitive display 104, an amount of pressure on the top surface of touch sensitive display 104, a duration of time of the touch on the top surface of touch sensitive display 104, a starting position of the touch and/or an ending position of the touch on the top surface of touch sensitive display 104 (e.g., a swiping motion), and/or other parameters.

The location of the touch on and/or near the top surface of touch sensitive display 104 may include an x-y coordinate of the location of the touch on and/or near the top surface of touch sensitive display 104. For example, inputs component 115 may be configured to detect that the touch on touch sensitive display 104 was located at x-y coordinates of (140, 280) from a defined origin point of (0, 0) and lasted 0.2 seconds. In this manner, touch parameters component may be configured to detect that the touch was a tap. Inputs component 115 may be configured to detect that the touch on the touch sensitive display was located at x-y coordinates of (250, 860) from a defined origin point of (0, 0) and lasted 2.0 seconds. Touch parameters component 115 may be configured to detect that the touch on the touch sensitive display began at x-y coordinates of (1280, 640) from a defined origin point of (0, 0) and ended at (1280, 840). In this manner, inputs component 115 may be configured to detect that the touch was a swiping motion.

Presentation component 114 may be configured to effectuate presentation of a user interface via touch sensitive display 104. The user interface may include a menu, graphics, inputs (e.g., presentation of buttons on touch sensitive display 104), the power display field, the visual information, and/or other items. Individual graphics and/or inputs displayed on touch sensitive display 104 may be associated with individual regions and/or locations. An individual region and/or location may include dimensions of the region and/or location (e.g., 106 px wide, 80 px high). An individual region and/or location may include x-y coordinates on an x-y plane (e.g., 106, 80). The input associated with the region with x-y coordinates of (106, 80) from a defined origin point of (0, 0) may indicate, for example, a record input (e.g., begin recording capture of the visual information). If inputs component 115 detects that the touch on touch sensitive display 104 is located at the same and/or approximate region on the x-y plane as a particular input displayed on touch sensitive display 104 (e.g., x-y coordinates of (106, 80)), inputs component 115 may be configured to determine selection of the input (e.g., the record input) based upon the input associated with the location and/or duration of the touch on touch sensitive display 104.

Figure 7:
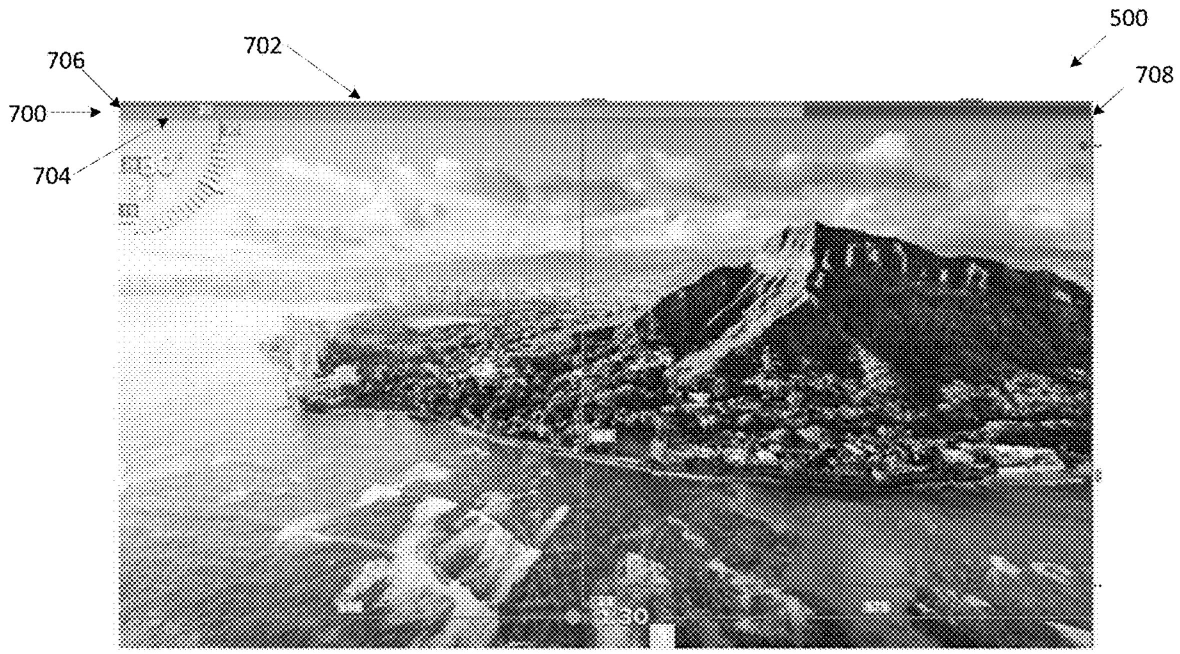
FIG. 7 illustrates an exemplary depiction of a user interface of a power display field, in accordance with one or more implementations.

If inputs component 115 detects that the parameters of the touch indicate a swiping motion on or near the power display field, presentation component 114 may be configured to effectuate presentation, via touch sensitive display 104, of a second power display field. The second power display field may include a narrower dimension of an edge of the second power display field than a corresponding edge of the power display field. For example, if the power display field is rectangular in shape, the power display field may include four edges; a first edge (e.g., a top edge), a second edge (e.g., a bottom edge) parallel to and opposite the first edge, a third edge (e.g., a left edge) perpendicular to the first edge and the second edge, and a fourth edge (e.g., a right edge) parallel to and opposite the third edge that is perpendicular to the first edge and the second edge. The second power display field may include a narrower dimension of an edge than a corresponding edge of the power display field. For example, referring to FIG. 7, second power display field 700 is shown via user interface 500. As shown in FIG. 7, second power display field 700 includes top edge 702, bottom edge 704 parallel to and opposite top edge 702, left edge 706 perpendicular to top edge 702 and bottom edge 704, and right edge 708 parallel to and opposite left edge 706 that is perpendicular to top edge 702 and bottom edge 704. As shown in FIG. 7, by swiping and/or tapping (e.g., single or double tapping), presentation component 114 may present second power display field 700 that includes a narrower dimension of left edge 706 and right edge 708 than the corresponding left edge and right edge of power display field 502 of FIG. 5. Second power display field 700 may include a first portion and a second portion, similar to power display field 502 of FIG. 5. The color associated with the first portion may be similar to power display field 502 of FIG. 5. In this manner, a user may view a minimized version of power display field 502 of FIG. 5 such that the user may view a more unobstructed view of subjects and/or content being captured by UAV. To return to power display field 502 of FIG. 5 (e.g., the original dimensions and/or lengths of the edges of power display field 502), the user may swipe and/or tap (e.g., single or double tapping) on and/or near second power display field 700 via touch sensitive display 104 such that presentation component 114 may present power display field 502 of FIG. 5 with the original dimensions and/or lengths of the edges of power display field 502.

Wireless control system 100 may be configured to arm UAV 300 and/or automatically takeoff UAV 300. Returning to FIGS. 1 and 2, inputs component 115 may be configured to receive an arm input when a first input mechanism of the multiple input mechanisms (e.g., one or more of input mechanisms **106*a*, 106*b*, and/or 106*c*) is engaged. Individual input mechanisms (e.g., one or more of input mechanisms 106*a*, 106*b*, and/or 106*c*) may be associated with various inputs and/or controls for wireless control system 100 and/or UAV 300 of FIG. 4 when engaged in various positions. For example, one of the multiple input mechanisms may include a button (e.g., input mechanism 106*b*). Engaging the button (e.g., pressing input mechanism 106*b* (the button)) for less than a first predetermined period of time may represent an input (e.g., an input to arm UAV 300), while engaging the button for more than the first predefined period of time may represent a different input (e.g., an input to initialize an automated takeoff of UAV 300). Inputs component 115 may be configured to receive the arm input when input mechanism 106*b* is engaged. Arming UAV 300 (e.g., receiving the arm input via input mechanism 106*b* in this example) may refer to engaging and/or turning on one or more rotors 402 (e.g., allowing for the rotors to begin rotating) of UAV 300 without UAV 300** lifting off a surface.

In response to receiving the arm input, transmission component 116 may be configured to effectuate transmission, via the first radio frequency transceiver, of a first set of instructions to UAV 300. The first set of instructions may be configured to arm UAV 300. As discussed above, arming UAV 300 may refer to engaging and/or turning on one or more rotors 402 (e.g., allowing for the rotors to begin rotating) of UAV 300 without UAV 300 lifting off. Transmission component 116 may be configured to effectuate transmission, via the first radio frequency transceiver, of the first set of instructions in real-time or near real-time to inputs component 115 determining and/or receiving the arm input. That is, when input mechanisms **106*b* is engaged, transmission component 116 may be configured to effectuate transmission, via the first radio frequency transceiver, of the first set of instructions including instructions to arm UAV 300 to UAV 300** in real-time or near real-time.

In response to receiving the arm input, takeoff component 117 may be configured to initiate an automated takeoff of UAV 300 if any one of the following conditions may be met: (1) the engagement of the first input mechanism that caused UAV 300 to be armed is continued for a first predefined period of time; (2) a touch on or near an indicated location of touch sensitive display 104 is detected; or (3) a second input mechanism of the multiple input mechanisms is engaged for less than a second predefined period of time. The automated takeoff of UAV 300 may refer to UAV 300 lifting off into the air without regard for user inputs received via touch sensitive display 104 and/or the multiple input mechanisms (input mechanisms 106*a*, 106*b*, and/or 106*c*) to adjust flight control settings of UAV 300. The automated takeoff of UAV 300 may include lifting off a surface for a predefined height before accepting adjustments to flight control settings and/or image capture subsystem 410 of UAV 300 from touch sensitive display 104 and/or the multiple input mechanisms (input mechanisms 106*a*, 106*b*, and/or 106*c*).

As described above, inputs component 115 may be configured to receive the arm input when the first input mechanism (e.g., input mechanism 106*b*) is engaged. If engagement of input mechanism 106*b* is continued without disengagement of input mechanism 106*b* for the first predefined period of time, takeoff component 117 may be configured to initiate the automated takeoff of UAV 300. The first predefined period of time may include a period of time that has been preconfigured for wireless control system 100, manually entered by a user of wireless control system 100, and/or other predefined in other ways.

Figure 8:
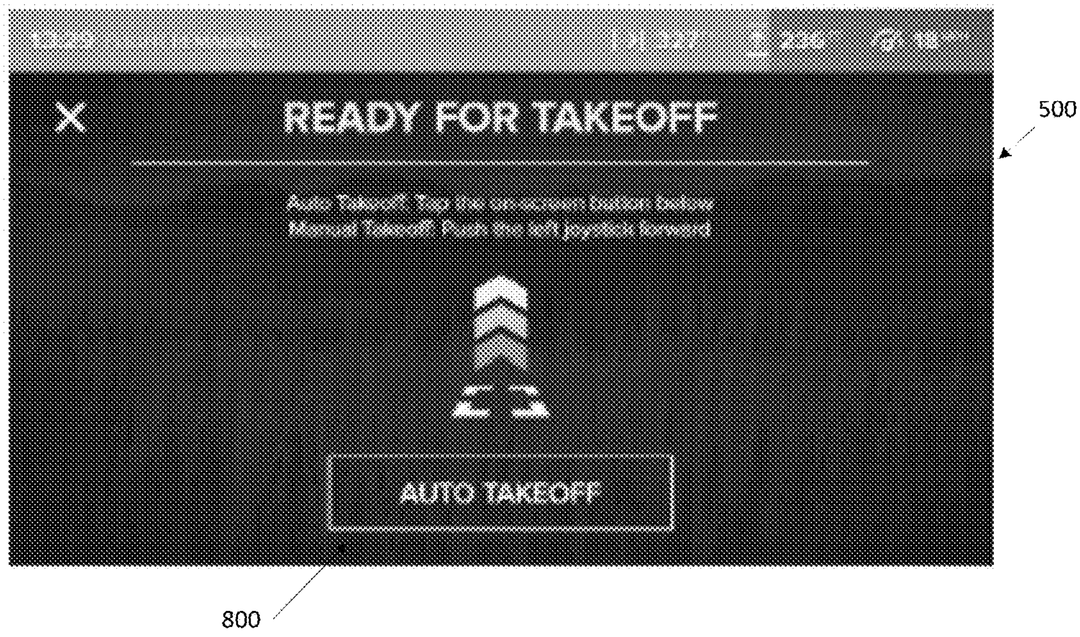
FIG. 8 illustrates an exemplary depiction of a user interface of an automated takeoff input, in accordance with one or more implementations.

In response to receiving the arm input, presentation component 114 may be configured to effectuate presentation, via touch sensitive display 104, of an automated takeoff input at the indicated location on touch sensitive display 104. Presentation component 114 may be configured to effectuate presentation, via touch sensitive display 104, of the automated takeoff input even if the first input mechanism (e.g., input mechanism 106*b*) continues to be engaged. As described above, presentation component 114 may be configured to effectuate presentation of a user interface via touch sensitive display 104. The user interface may include a menu, graphics, inputs (e.g., presentation of buttons and/or inputs on touch sensitive display 104), the power display field, the visual information, and/or other items. Individual graphics and/or inputs displayed on touch sensitive display 104 may be associated with individual regions and/or locations (an indicated location of touch sensitive display 104). The indicated location may include an area on touch sensitive display 104. The indicated location may include dimensions of the area and/or location (e.g., 106 px wide, 80 px high). As described above, the indicated location may include x-y coordinates on an x-y plane (e.g., 80, 160). The input associated with the region with x-y coordinates of (80, 160) from a defined origin point of (0, 0) may indicate, for example, engagement of the input represented at the indicated location (e.g., the automated takeoff input). If inputs component 115 detects that the touch on touch sensitive display 104 is located on or near the indicated location of the automated takeoff input on the x-y plane on touch sensitive display 104 (e.g., x-y coordinates of (80, 160)), inputs component 115 may be configured to determine selection of the automated takeoff input based upon the input associated with the indicated location and/or duration of the touch (e.g., less than a predefined period of time, such as 1 second, indicating a tap) on touch sensitive display 104. FIG. 8 illustrates an exemplary automated takeoff input 800 presented via user interface 500. The power display field is displayed within user interface 500 of FIG. 8.

In response to receiving the arm input, takeoff component 117 may be configured to initiate an automated takeoff of UAV 300 if a second input mechanism (e.g., one of input mechanisms 106*a* or 106*c*) of the multiple input mechanisms is engaged for less than a second predefined period of time. One or more of the multiple input mechanisms may include a joystick button (e.g., input mechanisms 106*a* and/or 106*c*). Engaging the joystick (e.g., input mechanism 106*a*) in an upward position for less than the second predefined period of time (e.g., tapping input mechanism 106*a* upward, rather than holding and/or continuously engaging input mechanism 106*a* upward) may initiate the automated take off of UAV 300. This is not meant to be a limitation of this disclosure, as individual input mechanisms may provide different inputs based upon an embodiment of wireless control system 100.

The second predefined period of time may be the same as the first predefined period of time or may be different. The second predefined period of time may include a period of time that has been preconfigured for wireless control system 100, manually entered by a user of wireless control system 100, and/or other predefined in other ways.

In response to receiving initiation of the automated takeoff, transmission component 116 may be configured to effectuate transmission, via the first radio frequency transceiver, of a second set of instructions to UAV 300. As discussed above, the second set of instructions may be configured to control UAV 300 without regard for user inputs received through touch sensitive display 104 and/or the multiple input mechanisms (input mechanisms 106*a*, 106*b*, and/or 106*c*). That is, the second set of instructions may be configured to automatically lift off UAV 300 from a surface without regard for user inputs received via touch sensitive display 104 and/or the multiple input mechanisms (input mechanisms 106*a*, 106*b*, and/or 106*c*) to adjust flight control settings of UAV 300. The automated takeoff of UAV 300 may include lifting off the surface for a predefined height before accepting adjustments to flight control settings and/or image capture subsystem 410 of UAV 300 from touch sensitive display 104 and/or the multiple input mechanisms (e.g., input mechanisms 106*a*, 106*b*, and/or 106*c*).

If the second input mechanism (e.g., input mechanism 106*a*) is engaged for at least the second predefined period of time, takeoff component 117 may be configured to initiate manual control of UAV 300 for takeoff. If input mechanism 106*a* includes a joystick, engaging the joystick (e.g., input mechanism 106*a*) in an upward position for at least the second predefined period of time (e.g., holding and/or continuously engaging input mechanism 106*a* upward rather than simply tapping input mechanism 106*a* upward), takeoff component 117 may initiate manual control of UAV 300.

Initiating manual control of UAV 300 for takeoff may include transmission component 116 being configured to effectuate transmission, via the first radio frequency transceiver, of instructions to UAV 300 that correspond directly to user inputs received through the multiple input mechanisms (e.g., input mechanisms 106*a*, 106*b*, and/or 106*c*). Manual control of UAV 300 may include adjusting flight controls of UAV 300. That is, the instructions may be configured to manually lift UAV 300 off of a surface based upon user inputs received through the multiple input mechanisms (e.g., input mechanisms 106*a*, 106*b*, and/or 106*c*). Instructions being configured to adjust flight controls may include instructions to adjust one or more of an altitude, a longitude, a latitude, a geographical location, a heading, a speed, and/or other flight controls of UAV 300.

Flight control of UAV 300 may be based upon a position of UAV 300. The position of UAV 300 may impact capture of the visual information. For example, an altitude in which UAV 300 is flying and/or hovering may impact the visual information captured by an image sensor (e.g., the visual information may be captured at different angles based upon the altitude of UAV 300). A speed and/or direction in which UAV 300 is traveling may capture different visual information. As such, a user may adjust and/or control UAV 300 via wireless control system 100 in any manner based upon various inputs via touch sensitive display 104 and/or input mechanisms 106*a*, 106*b*, and/or 106*c*.

Manual control of UAV 300 may include adjusting image capture subsystem 410 of UAV 300. That is, the instructions may be configured to adjust a camera of UAV 300 before, during, and/or after flight of UAV 300. Instructions being configured to adjust image capture subsystem 410 may include instructions to adjust a gimbal, one or more of an aperture timing, an exposure, a focal length, an angle of view, a depth of view, a focus, a light metering, a white balance, a resolution, a frame rate, an object of focus, a capture angle, a zoom parameter, a video format, a sound parameter, a compression parameter, and/or other aspects of image capture subsystem 410. Image capture subsystem 410 may be configured to control one or more sensors 408 such that the visual information captured by one or more image sensors of one or more sensors 408 may include an image and/or video segment of a particular object, user, and/or landscape. As such, a user may adjust and/or control image capture subsystem 410 of UAV 300 via wireless control system 100 in any manner based upon various inputs via touch sensitive display 104 and/or input mechanisms 106*a*, 106*b*, and/or 106*c*.

After initiating manual control of UAV 300 for takeoff, inputs component 115 may be configured to receive instructions to initiate the automated takeoff of UAV 300 via touch parameters of a touch on touch sensitive display 104 and/or the multiple input mechanisms (e.g., engagement of one or more of input mechanisms 106*a*, 106*b*, and/or 106*c*). For example, if the user initiated manual control of UAV 300 for takeoff, as discussed above, but the user then changes his or her mind and would like for the automated takeoff of UAV 300, inputs component 115 may be configured to received instructions to cancel and/or override manual control of UAV 300 and initiate automated takeoff of UAV 300 instead. In response to receiving instructions to initiate the automated takeoff of UAV 300 after initiating manual control of UAV 300 for takeoff, transmission component 116 may be configured to effectuate transmission, via the first radio frequency transceiver, of a third set of instructions to UAV 300. The third set of instructions may be configured to control UAV 300 without regard for user inputs received through touch sensitive display 104 and/or the multiple input mechanisms (e.g., input mechanisms 106*a*, 106*b*, and/or 106*c*), as discussed above.

After receiving the automated takeoff input, inputs component 115 may be configured to receive instructions to initiate the manual takeoff input via touch parameters of a touch on touch sensitive display 104 and/or one or more of the multiple input mechanisms (e.g., e.g., engagement of one or more of input mechanisms 106*a*, 106*b*, and/or 106*c*). For example, if the user initiated automated takeoff of UAV 300 as discussed above, but the user then changes his or her mind and would like for manual control of UAV 300 for takeoff, inputs component 115 may be configured to received instructions to cancel and/or override the automated takeoff of UAV 300 and initiate manual control of UAV 300 for takeoff instead. In response to receiving instructions to initiate the manual control of UAV 300 for takeoff after initiating automated takeoff of UAV 300, transmission component 116 may be configured to effectuate transmission, via the first radio frequency transceiver, of a fourth set of instructions to UAV 300. The fourth set of instructions may be configured to control UAV 300 directly from user inputs received through touch sensitive display 104 and/or the multiple input mechanisms (e.g., input mechanisms 106*a*, 106*b*, and/or 106*c*), as discussed above.

Wireless control system 100 may be configured to replay a video segment that was captured during flight of UAV 300. Similarly as discussed above, visual information component 111 may be configured to obtain, via the first radio frequency transceiver, visual information captured by image capture subsystem 410 of UAV 300. Similarly as discussed above, visual information component 111 may be configured to display the visual information via touch sensitive display 104.

Inputs component 115 may be configured to obtain a first set of instructions, via a first set of inputs, to begin recording the visual information as a first video segment. Inputs component 115 may be configured to obtain the first set of instructions from the first set of inputs by detecting a touch on or near touch sensitive display 104 and/or engagement of one or more of the multiple input mechanisms (e.g., input mechanisms 106*a*, 106*b*, and/or 106*c*). For example, presentation component 114 may be configured to effectuate presentation, via touch sensitive display 104, of a record input. Inputs component 115 may be configured to receive engagement and/or activation of the record input by detecting a touch on or proximate to the record input on touch sensitive display 104. In this manner, a user may record the visual information within the field of view of one or more sensors 408 of UAV 300 (via image capture subsystem 410).

Transmission component 116 may be configured to effectuate transmission, via the first radio frequency transceiver, of the first set of instructions to UAV 300. The first set of instructions may be configured to begin recording the visual information. The user may adjust flight control and/or control of image capture subsystem 410 via wireless control system 100 in a similar manner as discussed above while recording the visual information.

Inputs component 115 may be configured to obtain a second set of instructions, via a second set of inputs, to stop recording the first video segment. Inputs component 115 may be configured to obtain the second set of instructions from the second set of inputs by detecting a touch on or near touch sensitive display 104 and/or engagement of one or more of the multiple input mechanisms (e.g., input mechanisms 106*a*, 106*b*, and/or 106*c*). For example, presentation component 114 may be configured to effectuate presentation, via touch sensitive display 104, of a stop input. Inputs component 115 may be configured to receive engagement and/or activation of the stop input by detecting a touch on or proximate to the stop input on touch sensitive display 104. In this manner, a user may stop recording the visual information within the field of view of one or more sensors 408 of UAV 300 (via image capture subsystem 410). Transmission component 116 may be configured to effectuate transmission, via the first radio frequency transceiver, of the second set of instructions to UAV 300. The second set of instructions may be configured to stop recording the visual information. UAV 300 may store the first video segment in a electronic storage 416 and/or may store the first video segment in external storage for access at a later point in time. Additionally and/or alternatively, wireless control system 100 may be configured to store the first video segment in electronic storage 134 and/or may store the first video segment in external storage for access at a later point in time.

In response to the second set of instructions, presentation component 114 may be configured to effectuate presentation, via touch sensitive display 104, of a replay input. The replay input may refer to an input that may allow the user using wireless control system 100 to view the first video segment that UAV 300 captured. The user may view the first video segment while UAV remains in flight and/or may view the first video segment at a later time.

Inputs component 115 may be configured to receive, via a touch on and/or proximate to the replay input on touch sensitive display 104, engagement and/or activation of the replay input. In response to activation of the replay input, presentation component 114 may be configured to effectuate presentation, via touch sensitive display 104, of the first video segment. In this manner, the user using wireless control system 100 may view the first video segment while UAV remains in flight.

In some embodiments, the first video segment may be presented over the visual information. In this manner, the user may no longer be able to view the visual information of the field of view of one or more sensors 408 being received from UAV 300 via the first radio frequency transceiver while UAV 300 remains in flight.

In some embodiments, presentation component 114 may be configured to effectuate presentation, via touch sensitive display 104, of a split screen. The split screen may include a first portion and a second portion. The split screen may include display of one or more lines across touch sensitive display 104 to separate different portions of touch sensitive display 104. While two portions are described herein, this is for illustrative purposes only, as any number of lines may be displayed and/or depicted in order to separate touch sensitive display 104 into more than two portions (e.g., two lines may separate touch sensitive display 104 into four portions, etc.). The one or more lines may be oriented horizontally, vertically, diagonally, and/or oriented in any other manner to separate touch sensitive display 104 into portions.

The first video segment may be displayed within the first portion. The visual information may be displayed within the second portion. In this manner, the user may simultaneously view the first video segment and the visual information in order to adjust flight controls of UAV 300 and/or adjust image capture subsystem 410. For example, while viewing the first video segment, the user may use wireless control system 100 to adjust flight controls and/or adjust image capture subsystem 410 of UAV 300 while UAV 300 remains in flight. The user may view the visual information and the first video segment simultaneously such that the user may know what adjustments may be required to flight controls and/or image capture subsystem 410 of UAV 300 to capture an ideal video segment.

In some implementations, wireless control system 100 may be operatively linked, via one or more electronic communication links, to one or more servers, one or more client computing platforms (e.g., multi-purpose devices and/or other client computing platforms), and/or external resources. For example, such electronic communication links may be established, at least in part, via a network such as the Internet and/or other networks. It will be appreciated that this is not intended to be limiting, and that the scope of this disclosure includes implementations in which servers, client computing platforms, and/or external resources may be operatively linked via some other communication media.

External resources may include sources of information, hosts and/or providers of virtual environments outside of wireless control system 100, external entities participating with wireless control system 100, and/or other resources. In some implementations, some or all of the functionality attributed herein to external resources may be provided by resources included in wireless control system 100.

Wireless control system 100 may include communication lines, or ports to enable the exchange of information with a network and/or other computing platforms. Illustration of wireless control system 100 in FIGS. 1 and/or 2 are not intended to be limiting. Wireless control system 100 may include a plurality of hardware, software, and/or firmware components operating together to provide the functionality attributed herein to wireless control system 100. For example, processor 108 may be implemented by a cloud of computing platforms operating together as processor 108.

Processor 108 may be configured to provide information processing capabilities in wireless control system 100. As such, processor 108 may include one or more of a digital processor, an analog processor, a digital circuit designed to process information, an analog circuit designed to process information, a state machine, and/or other mechanisms for electronically processing information. Although processor 108 is shown in FIG. 2 as a single entity, this is for illustrative purposes only. In some implementations, processor 108 may include a plurality of processing units. These processing units may be physically located within the same device, or processor 108 may represent processing functionality of a plurality of devices operating in coordination. The processor 108 may be configured to execute computer readable instruction components 111, 112, 113, 114, 115, 116, 117, and/or other components. The processor 108 may be configured to execute components 111, 112, 113, 114, 115, 116, 117 and/or other components by software, hardware, firmware, some combination of software, hardware, and/or firmware, and/or other mechanisms for configuring processing capabilities on processor 108.

It should be appreciated that although components 111, 112, 113, 114, 115, 116, and 117 are illustrated in FIG. 2 as being co-located within a single processing unit, in implementations in which processor 108 includes multiple processing units, one or more of components 111, 112, 113, 114, 115, 116, and/or 117 may be located remotely from the other components. The description of the functionality provided by the different components 111, 112, 113, 114, 115, 116, and/or 117 described herein is for illustrative purposes, and is not intended to be limiting, as any of components 111, 112, 113, 114, 115, 116, and/or 117 may provide more or less functionality than is described. For example, one or more of components 111, 112, 113, 114, 115, 116, and/or 117 may be eliminated, and some or all of its functionality may be provided by other ones of components 111, 112, 113, 114, 115, 116, and/or 117. As another example, processor 108 may be configured to execute one or more additional components that may perform some or all of the functionality attributed herein to one of components 111, 112, 113, 114, 115, 116, and/or 117.

Figure 9:
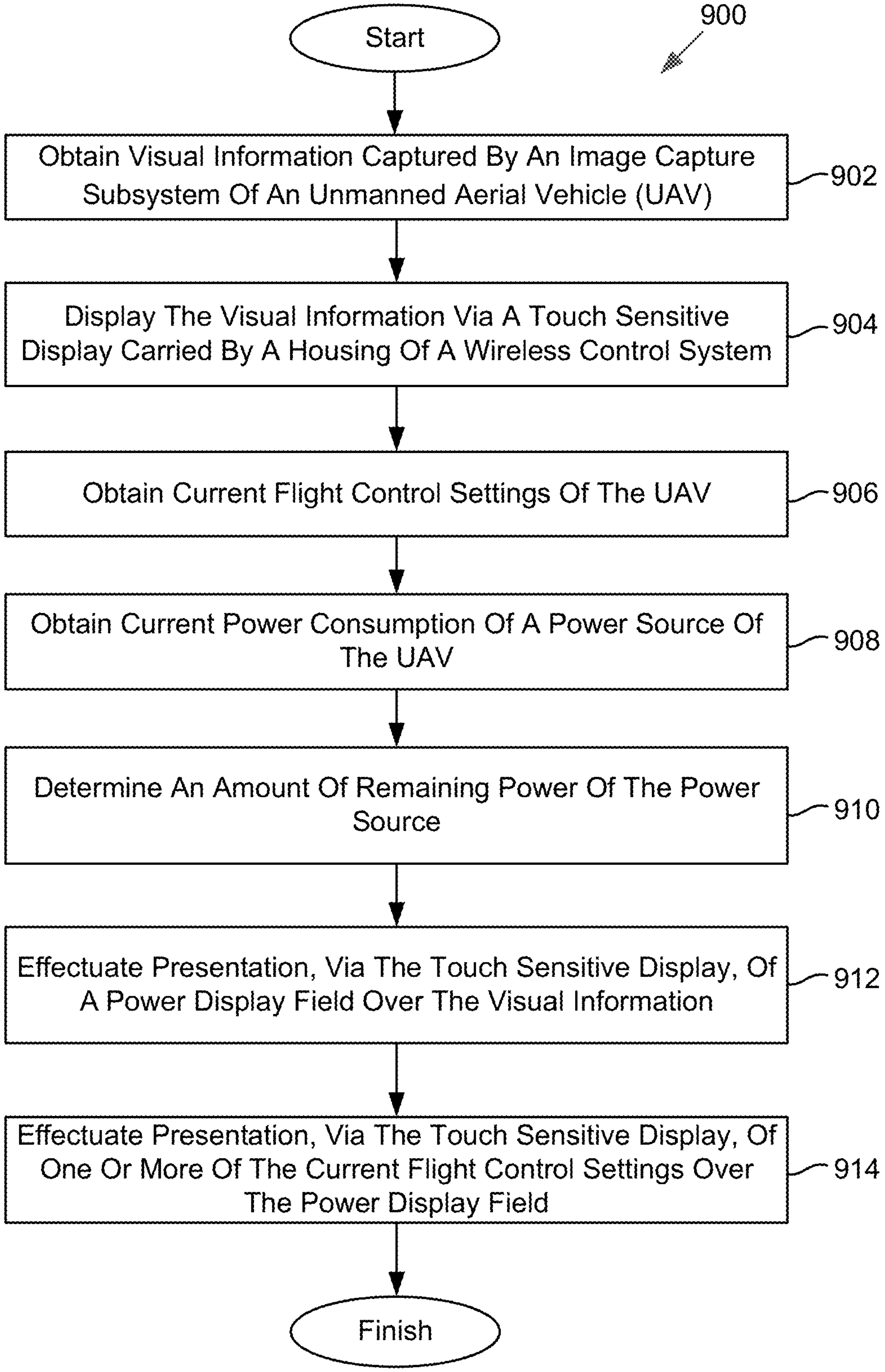
FIG. 9 illustrates a method for presenting a power display field, in accordance with one or more implementations.

FIG. 9 illustrates a method 900 for presenting a power display field, in accordance with one or more implementations. The operations of method 900 presented below are intended to be illustrative. In some implementations, method 900 may be accomplished with one or more additional operations not described, and/or without one or more of the operations discussed. Additionally, the order in which the operations of method 900 are illustrated in FIG. 9 and described below is not intended to be limiting.

At an operation 902, visual information captured by an image capture subsystem of the UAV may be obtained. Operation 902 may be performed by a visual information component that is the same as or similar to visual information component 111, in accordance with one or more implementations.

At an operation 904, the visual information may be displayed via a touch sensitive display carried by a housing of a wireless control system. Operation 904 may be performed by a visual information component that is the same as or similar to visual information component 111, in accordance with one or more implementations.

At an operation 906, current flight control settings of the UAV may be obtained. The current flight control settings may define current aspects of a flight control subsystem for the UAV. Operation 906 may be performed by a flight control settings component that is the same as or similar to flight control settings component 112, in accordance with one or more implementations.

At an operation 908, current power consumption of a power source of the UAV may be obtained. The power source may power the UAV. Operation 908 may be performed by a power component that is the same as or similar to power component 113, in accordance with one or more implementations.

At an operation 910, an amount of remaining power of the power source may be determined. Operation 910 may be performed by a power component that is the same as or similar to power component 113, in accordance with one or more implementations.

At an operation 912, a power display field may be presented via the touch sensitive display. The power display field may be presented over the visual information. Operation 912 may be performed by a presentation component that is the same as or similar to presentation component 114 in accordance with one or more implementations.

At an operation 914, one or more of the current flight control settings may be presented via the touch sensitive display. The one or more of the current flight control settings may be displayed over the power display field. Operation 914 may be performed by a presentation component that is the same as or similar to presentation component 114 in accordance with one or more implementations.

Figure 10:
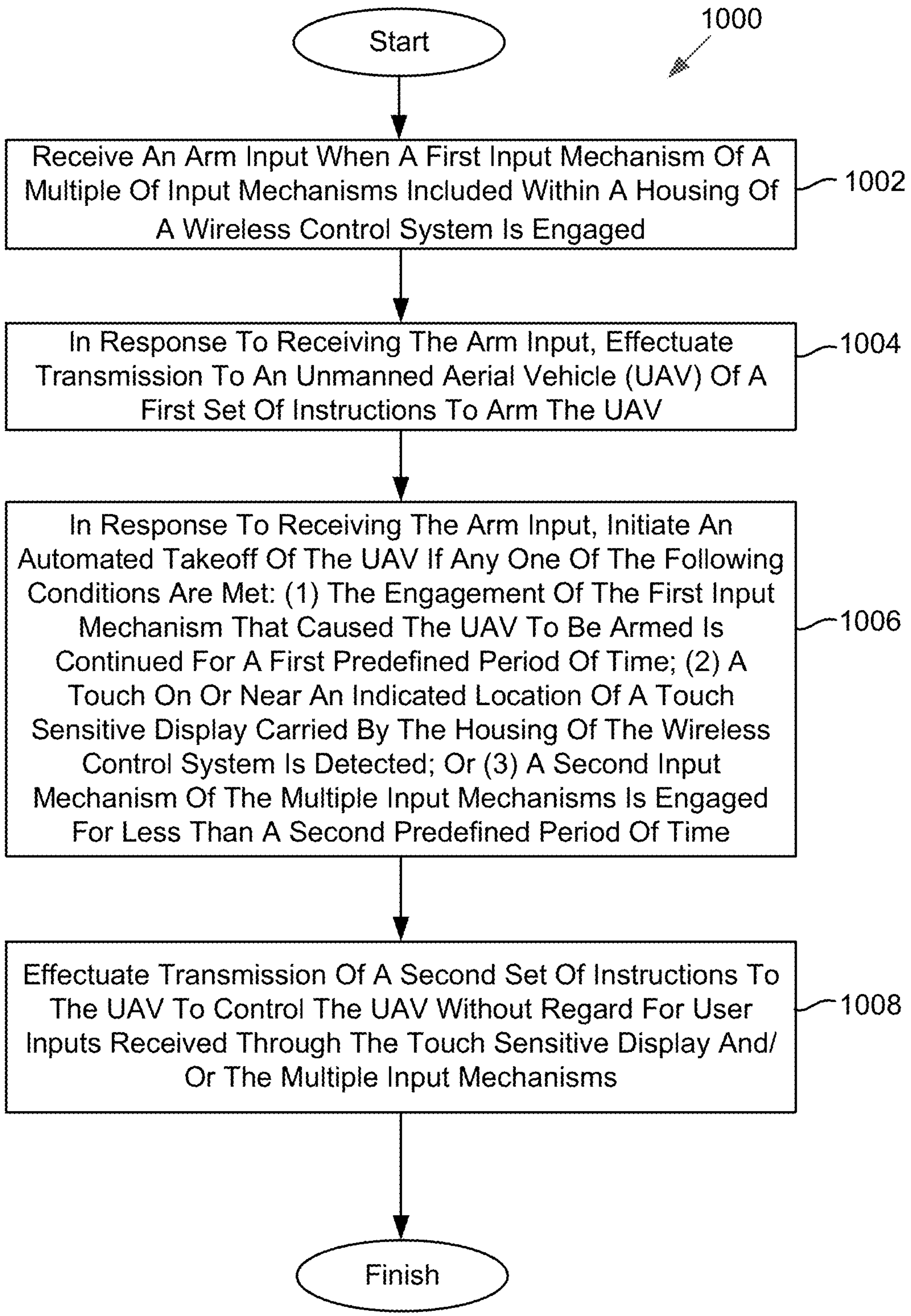
FIG. 10 illustrates a method for initializing an automated takeoff of an unmanned aerial vehicle, in accordance with one or more implementations.

FIG. 10 illustrates a method 1000 for initializing an automated takeoff of the UAV, in accordance with one or more implementations. The operations of method 1000 presented below are intended to be illustrative. In some implementations, method 1000 may be accomplished with one or more additional operations not described, and/or without one or more of the operations discussed. Additionally, the order in which the operations of method 1000 are illustrated in FIG. 10 and described below is not intended to be limiting.

At an operation 1002, an arm input may be received when a first input mechanism of a multiple of input mechanisms included within a housing of a wireless control system is engaged. Operation 1002 may be performed by an inputs component that is the same as or similar to inputs component 115, in accordance with one or more implementations.

At an operation 1004, a first set of instructions may be transmitted to the UAV to arm the UAV in response to receiving the arm input. Operation 1004 may be performed by a transmission component that is the same as or similar to transmission component 116, in accordance with one or more implementations. At an operation 1006, an automated takeoff of the UAV may be initialized in response to receiving the arm input. The automated takeoff of the UAV may initialized if any of the following conditions are met: (1) the engagement of the first input mechanism that caused the unmanned aerial vehicle to be armed is continued for a first predefined period of time; (2) a touch on or near an indicated location of the touch sensitive display is detected; or (3) a second input mechanism of the multiple input mechanisms is engaged for less than a second predefined period of time. Operation 1006 may be performed by a takeoff component that is the same as or similar to takeoff component 117, in accordance with one or more implementations.

At an operation 1008, a second set of instructions may be transmitted to the UAV. The second set of instructions may be configured to control the UAV without regard for user inputs received through the touch sensitive display and/or the multiple input mechanisms. Operation 1008 may be performed by a transmission component that is the same as or similar to transmission component 116, in accordance with one or more implementations.

Figure 11:
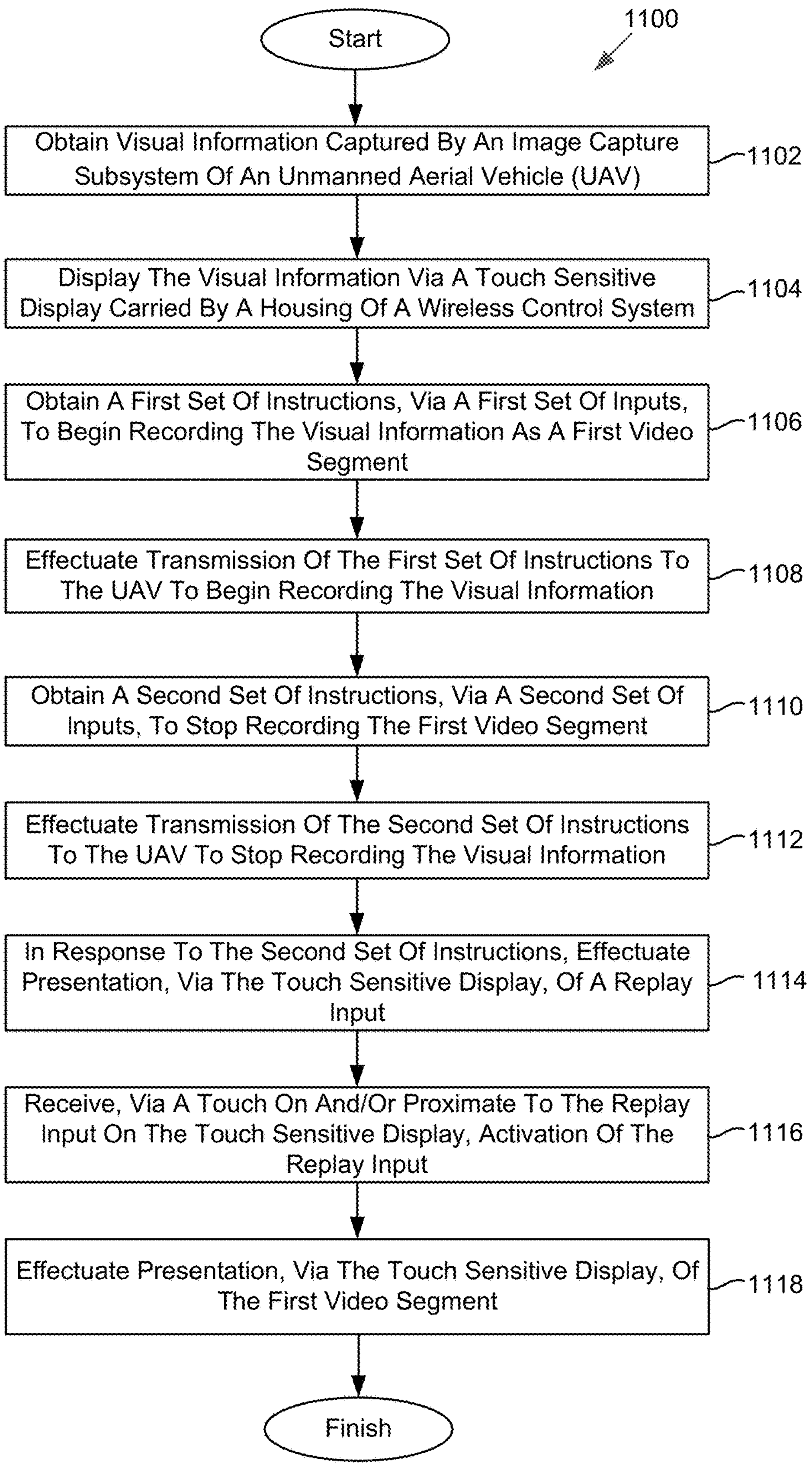
FIG. 11 illustrates a method for presenting replay of a video segment captured by an unmanned aerial vehicle, in accordance with one or more implementations.

FIG. 11 illustrates a method 1100 for presenting replay of a video segment captured by the UAV, in accordance with one or more implementations. The operations of method 1100 presented below are intended to be illustrative. In some implementations, method 1100 may be accomplished with one or more additional operations not described, and/or without one or more of the operations discussed. Additionally, the order in which the operations of method 1100 are illustrated in FIG. 11 and described below is not intended to be limiting.

At an operation 1102, visual information captured by an image capture subsystem of the UAV may be obtained. Operation 1102 may be performed by a visual information component that is the same as or similar to visual information component 111, in accordance with one or more implementations.

At an operation 1104, the visual information may be displayed via a touch sensitive display carried by a housing of a wireless control system. Operation 1104 may be performed by a visual information component that is the same as or similar to visual information component 111, in accordance with one or more implementations.

At an operation 1106, a first set of instructions may be obtained via a first set of inputs to begin recording the visual information as a first video segment. Operation 1106 may be performed by an inputs component that is the same as or similar to inputs component 115, in accordance with one or more implementations.

At an operation 1108, the first set of instructions may be transmitted to the UAV. The first set of instructions may be configured to begin recording the visual information. Operation 1108 may be performed by a transmission component that is the same as or similar to transmission component 116, in accordance with one or more implementations.

At an operation 1110, a second set of instructions may be obtained via a second set of inputs to stop recording the first video segment. Operation 1110 may be performed by an inputs component that is the same as or similar to inputs component 115, in accordance with one or more implementations.

At an operation 1112, the second set of instructions may be transmitted to the UAV. The second set of instructions may be configured to stop recording the visual information. Operation 1112 may be performed by a transmission component that is the same as or similar to transmission component 116, in accordance with one or more implementations.

At an operation 1114, a reply input may be presented via the touch sensitive display in response to the second set of instructions. Operation 1114 may be performed by a presentation component that is the same as or similar to presentation component 114 in accordance with one or more implementations.

At an operation 1116, activation of the replay input may be received via a touch on and/or proximate to the replay input on the touch sensitive display. Operation 1116 may be performed by an inputs component that is the same as or similar to inputs component 115 in accordance with one or more implementations.

At an operation 1118, the first video segment may be presented via the touch sensitive display in response to activation of the replay input. Operation 1118 may be performed by a presentation component that is the same as or similar to presentation component 114 in accordance with one or more implementations.

In some implementations, methods 900, 1000, and/or 1100 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 900, 1000, and/or 1100 in response to instructions stored electronically on an electronic storage medium. The one or more processing devices may include one or more devices configured through hardware, firmware, and/or software to be specifically designed for execution of one or more of the operations of methods 900, 1000, and/or 1100.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system, comprising:

an unmanned aerial vehicle (UAV), comprising:

one or more sensors configured to capture contextual information associated with capture of visual information, wherein the contextual information includes information pertaining to an environment in which the visual information was captured, and spatial attributes related to the environment in which the visual information was captured; and a UAV communication subsystem comprising a first UAV radio frequency transceiver configured to communicate with a network; and a wireless control system in communication with the UAV, the wireless control system comprising:

a housing;

a display located within the housing;

a wireless communication subsystem in communication with the UAV communication subsystem, wherein the wireless communication subsystem comprises a second UAV radio frequency transceiver in communication with the UAV;

a flight control setting component in communication with the first UAV radio frequency transceiver and configured to obtain current flight control settings of the UAV;

a power component configured to obtain, via the first UAV radio frequency transceiver, a current power consumption of a power source of the UAV;

a processor included within the housing, wherein the processor is configured to:

obtain, via the first UAV radio frequency transceiver, visual information captured by the one or more sensors of the UAV;

display the visual information on the display;

obtain a first set of instructions, via a first set of inputs, to begin recording the visual information as a first video segment;

effectuate transmission of the first set of instructions to the UAV to begin recording the visual information;

obtain a second set of instructions, via a second set of inputs, to stop recording the first video segment;

effectuate transmission of the second set of instructions to the UAV to stop recording the visual information;

in response to the second set of instructions, effectuate presentation, via the display, of a replay input;

receive, via a touch on the replay input on the display, activation of the replay input; and in response to activation of the replay input, effectuate presentation, via the display, of the first video segment while the UAV remains in flight;

communicate with the flight control setting component to obtain the current flight control settings of the UAV, wherein the current flight control settings define current aspects of a flight control subsystem for the UAV;

communicate with the power component to obtain the current power consumption of the power source of the UAV, wherein the power source powers the UAV;

effectuate presentation of a power display field over the visual information, wherein the power display field includes a first portion and a second portion.

2. The system of claim 1, wherein the display is a touch sensitive display carried within the housing.

3. The system of claim 2, wherein the touch sensitive display comprises a split screen having a first screen portion and a second screen portion, wherein the visual information is visible through the second portion of the power display field; and wherein the replay input is displayed on the first screen portion and the visual information related to current visual information, being captured, is displayed on the second screen portion.

4. The system of claim 3, wherein the flight control setting component obtains and displays one or more of the current flight control settings within the second portion of the split screen and the one or more of the current flight control settings are viewable over the visual information.

5. The system of claim 1, wherein the flight control setting component provides a set of instructions that are configured to control the UAV without regard for user inputs received.

6. The system of claim 5, wherein the processor is further configured to:

determine a remaining flight time of the UAV based upon an amount of remaining power of the power source and the current flight control settings.

7. The system of claim 6, wherein the processor is further configured to:

effectuate presentation, via the display that is a touch sensitive display, of the remaining flight time of the UAV over the first portion of the power display field, and the power display field extends along a top edge of the touch sensitive display.

8. The system of claim 7, wherein the processor is further configured to:

detect parameters of a touch on the touch sensitive display, the parameters of the touch including a location of the touch on the touch sensitive display and/or a pressure of the touch on the touch sensitive display; and if the parameters of the touch indicate a swiping motion on or near the power display field, effectuate presentation, via the touch sensitive display, of a second power display field, the second power display field including a narrower dimension of an edge of the second power display field than a corresponding edge of the power display field.

9. A system comprising:

an unmanned aerial vehicle (UAV) comprising:

one or more sensors configured to capture contextual information associated with capture of visual information, wherein the contextual information includes information pertaining to an environment in which the visual information was captured, and spatial attributes related to the environment in which the visual information was captured;

a UAV communication subsystem comprising:

a first UAV radio frequency transceiver configured to communicate with a network; and a wireless control system in communication with the UAV, the wireless control system comprising:

a housing;

a touch sensitive display carried by the housing;

a wireless communication subsystem in communication with the UAV communication subsystem, wherein the wireless communication subsystem comprises:

a second UAV radio frequency transceiver in communication with the UAV;

a flight control setting component in communication with the first UAV radio frequency transceiver and configured to obtain current flight control settings of the UAV;

a power component configured to obtain, via the first UAV radio frequency transceiver, a current power consumption of a power source of the UAV;

a processor included within the housing, wherein the processor is configured to:

obtain, via the first UAV radio frequency transceiver, visual information captured by the one or more sensors of the UAV;

display the visual information on the touch sensitive display;

obtain a first set of instructions, via a first set of inputs, to begin recording the visual information as a first video segment;

effectuate transmission of the first set of instructions to the UAV to begin recording the visual information;

obtain a second set of instructions, via a second set of inputs, to stop recording the first video segment;

effectuate transmission of the second set of instructions to the UAV to stop recording the visual information;

in response to the second set of instructions, effectuate presentation, via the touch sensitive display, of a replay input;

receive, via a touch on the replay input on the touch sensitive display, activation of the replay input; and in response to activation of the replay input, effectuate presentation, via the display, of the first video segment while the UAV remains in flight;

communicate with the flight control setting component to obtain the current flight control settings of the UAV, wherein the current flight control settings define current aspects of a flight control subsystem for the UAV;

initiate an automated takeoff of the UAV without regard for user inputs received via the touch sensitive display and/or the UAV communication subsystem;

communicate with the power component to obtain the current power consumption of the power source of the UAV;

effectuate presentation of a power display field over the touch sensitive display, wherein the touch sensitive display includes a first screen portion and a second screen portion.

10. The system of claim 9, wherein the processor is further configured to:

effectuate presentation, via the touch sensitive display, of an automated takeoff input at an indicated location on the touch sensitive display in response to receiving an arm input, wherein the indicated location on the touch sensitive display is an area on the touch sensitive display.

11. The system of claim 10, wherein the automated takeoff of the UAV includes lifting off of a surface to a predetermined height before accepting adjustments to flight control settings and/or accepting control of the one or more sensors, and further comprising a visual information component configured to obtain, via the first UAV radio frequency transceiver, the visual information captured by the one or more sensors of the UAV and to display the visual information on the touch sensitive display.

12. The system of claim 9, wherein the power display field comprises a top edge, a bottom edge, a left edge, and a right edge with the top edge and the bottom edge being parallel and the left edge being perpendicular to the top edge and the bottom edge.

13. The system of claim 12, further comprising: an angular display on the touch sensitive display that displays an angle of the UAV while the UAV is in motion.

14. The system of claim 13, wherein the angular display is located within a corner of the touch sensitive display.

15. The system of claim 9, wherein the processor is further configured to:

effectuate transmission, via the second UAV radio frequency transceiver, of a set of instructions to the UAV, the set of instructions being configured to control the UAV without regard for user inputs received through the touch sensitive display.

16. A system comprising:

an unmanned aerial vehicle (UAV) comprising:

one or more sensors configured to capture contextual information associated with capture of visual information, wherein the contextual information includes information pertaining to an environment in which the visual information was captured, and spatial attributes related to the environment in which the visual information was captured;

a UAV communication subsystem comprising:

a first UAV radio frequency transceiver configured to communicate with a network; and a wireless control system in communication with the UAV, the wireless control system comprising:

a housing;

a touch sensitive display carried by the housing;

a wireless communication subsystem in communication with the UAV communication subsystem, wherein the wireless communication subsystem comprises:

a second UAV radio frequency transceiver in communication with the UAV;

a power component configured to obtain, via the first UAV radio frequency transceiver, current power consumption of a power source of the UAV;

a processor included within the housing, wherein the processor is configured to:

obtain, via the first UAV radio frequency transceiver, visual information captured by the one or more sensors of the UAV;

display the visual information on the touch sensitive display;

obtain a first set of instructions, via a first set of inputs, to begin recording the visual information as a first video segment;

effectuate transmission of the first set of instructions to the UAV to begin recording the visual information;

obtain a second set of instructions, via a second set of inputs, to stop recording the first video segment;

effectuate transmission of the second set of instructions to the UAV to stop recording the visual information;

in response to the second set of instructions, effectuate presentation, via the display, of a replay input;

receive, via a touch on the replay input on the touch sensitive display, activation of the replay input; and in response to activation of the replay input, effectuate presentation, via the touch sensitive display, of the first video segment while the UAV remains in flight;

communicate with the power component to obtain the current power consumption of the power source of the UAV;

display a power display field that comprises a top edge, a bottom edge, a left edge, and a right edge with the top edge and the bottom edge being parallel and the left edge being perpendicular to the top edge and the bottom edge;

display an angular display within a corner of the touch sensitive display;

communicate with a flight control setting component to obtain a current flight control settings of the UAV, wherein the current flight control settings define current aspects of a flight control subsystem for the UAV;

initiate an automated takeoff of the UAV without regard for user inputs received via the touch sensitive display and/or the UAV communication subsystem;

effectuate presentation of the power display field over the touch sensitive display, wherein the touch sensitive display includes a first screen portion and a second screen portion.

17. The system of claim 16, wherein the processor is further configured to:

effectuate presentation, via the touch sensitive display, of an automated takeoff input at an indicated location on the touch sensitive display in response to receiving an arm input, wherein the indicated location on the touch sensitive display is an area on the touch sensitive display.

18. The system of claim 17, wherein the automated takeoff of the UAV includes lifting off of a surface to a predetermined height before accepting adjustments to flight control settings and/or accepting control of the one or more sensors.

19. The system of claim 16, wherein the processor is further configured to:

effectuate transmission, via the second UAV radio frequency transceiver, of a set of instructions to the UAV, the set of instructions being configured to control the UAV without regard for user inputs received through the touch sensitive display.

20. The system of claim 16, wherein the visual information is visible through the second screen portion of the power display field.

* * * * *